(12) United States Patent
Yoshizawa et al.

(10) Patent No.: US 9,815,471 B2
(45) Date of Patent: Nov. 14, 2017

(54) WORK VEHICLE AND METHOD FOR CONTROLLING SAME

(71) Applicant: KOMATSU LTD., Tokyo (JP)

(72) Inventors: Masao Yoshizawa, Hiratsuka (JP); Shunsuke Miyamoto, Atsugi (JP); Kenichi Yamada, Fujisawa (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/892,647

(22) PCT Filed: Dec. 16, 2014

(86) PCT No.: PCT/JP2014/083259
§ 371 (c)(1),
(2) Date: Nov. 20, 2015

(87) PCT Pub. No.: WO2015/093477
PCT Pub. Date: Jun. 25, 2015

(65) Prior Publication Data
US 2016/0121900 A1    May 5, 2016

(30) Foreign Application Priority Data
Dec. 17, 2013 (JP) .............................. 2013-260523

(51) Int. Cl.
*B60W 10/06* (2006.01)
*F16H 61/472* (2010.01)
(Continued)

(52) U.S. Cl.
CPC ......... *B60W 30/1888* (2013.01); *B60K 6/445* (2013.01); *B60K 25/02* (2013.01);
(Continued)

(58) Field of Classification Search
USPC .... 701/50–51, 54, 79, 87; 475/78, 149, 135, 475/151, 286, 323; 184/26, 27.1;
(Continued)

(56) References Cited

U.S. PATENT DOCUMENTS

| | | | | |
|---|---|---|---|---|
| 5,485,885 A | * | 1/1996 | Matsushita | ........... E02F 9/2029 172/7 |
| 5,515,927 A | * | 5/1996 | Matsushita | ........... E02F 9/2029 172/3 |

(Continued)

FOREIGN PATENT DOCUMENTS

| | | |
|---|---|---|
| CN | 101297106 A | 10/2008 |
| JP | 11-210514 A | 8/1999 |

(Continued)

OTHER PUBLICATIONS

Putting electronics to work in the 1991 car models; R. K. Jurgen; IEEE Spectrum; Year: 1990, vol. 27, Issue: 12 pp. 72-75, DOI: 10.1109/6.60944.*

(Continued)

*Primary Examiner* — Cuong H Nguyen
(74) *Attorney, Agent, or Firm* — Global IP Counselors, LLP

(57) ABSTRACT

A work vehicle is equipped with an engine, a hydraulic pump, a work implement, a travel device, an accelerator operating member, a work implement operating member, and a control unit. The hydraulic pump is driven by the engine. The work implement is driven by hydraulic fluid discharged from the hydraulic pump. The travel device is driven by the engine. The accelerator operating member changes the engine rotation speed. The work implement operating member operates the work implement. The control unit causes the speed of the work implement to increase by causing the engine rotation speed to increase when an (Continued)

operation amount of the work implement operating member is increased.

10 Claims, 12 Drawing Sheets

(51) Int. Cl.
| | | |
|---|---|---|
| E02F 3/64 | (2006.01) | |
| B60W 30/188 | (2012.01) | |
| B60K 6/445 | (2007.10) | |
| B60K 25/02 | (2006.01) | |
| B60W 10/30 | (2006.01) | |
| E02F 9/20 | (2006.01) | |
| E02F 9/22 | (2006.01) | |
| F04B 17/05 | (2006.01) | |
| F04B 49/06 | (2006.01) | |
| F04B 49/20 | (2006.01) | |

(52) U.S. Cl.
CPC ............ *B60W 10/06* (2013.01); *B60W 10/30* (2013.01); *B60W 30/1886* (2013.01); *E02F 9/2079* (2013.01); *E02F 9/2246* (2013.01); *E02F 9/2253* (2013.01); *E02F 9/2289* (2013.01); *E02F 9/2292* (2013.01); *E02F 9/2296* (2013.01); *F04B 17/05* (2013.01); *F04B 49/06* (2013.01); *F04B 49/20* (2013.01); *B60K 2025/026* (2013.01); *Y02T 10/6239* (2013.01)

(58) Field of Classification Search
USPC ............ 414/685, 679–680; 172/3; 180/306
See application file for complete search history.

(56) References Cited

U.S. PATENT DOCUMENTS

| | | | | |
|---|---|---|---|---|
| 5,535,830 | A * | 7/1996 | Matsushita | E02F 9/2029 172/4.5 |
| 5,555,942 | A * | 9/1996 | Matsushita | E02F 9/2029 172/3 |
| 5,564,507 | A * | 10/1996 | Matsushita | E02F 9/2029 172/3 |
| 5,621,643 | A * | 4/1997 | Nakagami | E02F 3/844 172/3 |
| 5,694,317 | A * | 12/1997 | Nakagami | E02F 3/844 172/2 |
| 5,699,248 | A * | 12/1997 | Nakagami | E02F 3/844 172/2 |
| 5,819,190 | A * | 10/1998 | Nakagami | E02F 3/844 172/12 |
| 6,181,999 | B1 * | 1/2001 | Yamamoto | E02F 3/844 172/4.5 |
| 6,705,030 | B2 | 3/2004 | Tokunaga | |
| 7,493,987 | B2 | 2/2009 | Puszkiewicz et al. | |
| 8,155,834 | B2 * | 4/2012 | Murahashi | B60B 11/06 180/339 |
| 8,160,773 | B2 * | 4/2012 | Nabeshima | B60B 11/06 180/339 |
| 8,321,085 | B2 * | 11/2012 | Saito | B60W 10/026 172/4.5 |
| 8,565,985 | B2 * | 10/2013 | Nakagawa | E02F 9/2246 192/218 |
| 8,571,763 | B2 * | 10/2013 | Saito | B60W 10/06 414/685 |
| 8,589,038 | B2 * | 11/2013 | Hagiwara | E02F 9/226 180/306 |
| 8,676,467 | B2 * | 3/2014 | Fujimoto | B60W 10/06 701/50 |
| 8,812,197 | B2 | 8/2014 | Itu et al. | |
| 9,347,204 | B2 | 5/2016 | Kim et al. | |
| 9,561,788 | B2 | 2/2017 | Ito | |
| 9,561,789 | B2 | 2/2017 | Nishi et al. | |
| 2005/0071068 | A1 * | 3/2005 | Funato | B60W 10/06 701/54 |
| 2009/0105028 | A1 * | 4/2009 | Hiraki | B60K 6/445 475/78 |
| 2009/0265065 | A1 | 10/2009 | Ikari | |
| 2010/0131158 | A1 | 5/2010 | Saito | |
| 2010/0152981 | A1 * | 6/2010 | Nishi | F16H 61/423 701/50 |
| 2010/0187044 | A1 * | 7/2010 | Nabeshima | B60B 11/06 184/26 |
| 2011/0318156 | A1 * | 12/2011 | Saito | B60W 10/06 414/685 |
| 2012/0010790 | A1 * | 1/2012 | Kanayama | E02F 9/2296 701/50 |
| 2012/0247846 | A1 | 10/2012 | Ichikawa | |
| 2012/0271519 | A1 * | 10/2012 | Nishi | F16H 61/423 701/50 |
| 2015/0006010 | A1 * | 1/2015 | Ito | E02F 9/2075 701/22 |

FOREIGN PATENT DOCUMENTS

| | | | |
|---|---|---|---|
| JP | 2004-144254 A | | 5/2004 |
| JP | 2006-329244 A | | 12/2006 |
| JP | 2013-166482 A | | 2/2012 |
| WO | WO98/11303 | * | 3/1998 |

OTHER PUBLICATIONS

Efficiency analysis of an innovative multi-range hydro-mechanical continuously variable transmission; Zhang Mingzhu; Zhou Zhili; Xu Liyou; 2009 IEEE International Conference on Automation and Logistics; Year: 2009; pp. 170-174, DOI: 10.1109/ICAL.2009. 5262944.*
Counterbalancing Speed Control for Hydrostatic Drive Heavy Vehicle Under Long Down-Slope; Yunhua Li; Liuyu He; IEEE/ASME Transactions on Mechatronics; Year: 2015, vol. 20, Issue: 4; pp. 1533-1542, DOI: 10.1109/TMECH.2014.2385700.*
Design to reduce the cost and to improve the mechanical durability of IPMSM for the traction motor of military truck; Ki-Doek Lee; Mi-Jung Kim; Jung-Ho Han; Tae-Chul Jeong; Chang-Sung Jin; Won-Ho Kim; Ju Lee; 2012 IEEE Vehicle Power and Propulsion Conference; Year: 2012; pp. 154-159, DOI: 10.1109/VPPC.2012. 6422530.*
The International Search Report for the corresponding international application No. PCT/JP2014/083259, issued on Mar. 10, 2015.
The extended European search report for the corresponding European application No. 14872328.1, dated Feb. 8, 2017.
The Office Action for the corresponding Chinese application No. 201480032787.8, dated May 12, 2017.
Dynamic analysis of load sense steering hydraulic system priority valve; Zhiguo Zhao; Lv Chang; 2011 Second International Conference on Mechanic Automation and Control Enginnering; Year: 2011: pp. 1249-1252, DOI: 10.1109/Mace.2011.5987168: Referenced in: IEEE Conference Publications.
The Office Action for the corresponding U.S. Appl. No. 15/415,999, dated Apr. 21, 2017.

* cited by examiner

WORK VEHICLE AND METHOD FOR CONTROLLING SAME

CROSS-REFERENCE TO RELATED APPLICATIONS

This application is a U.S. National stage application of International Application No. PCT/JP2014/083259, filed on Dec. 16, 2014. This U.S. National stage application claims priority under 35 U.S.C. §119(a) to Japanese Patent Application No. 2013-260523, filed in Japan on Dec. 17, 2013, the entire contents of which are hereby incorporated herein by reference.

BACKGROUND

Field of the Invention

The present invention relates to a work vehicle and method for controlling the work vehicle.

A hydraulic pump in a work vehicle is driven by driving power from an engine. A work implement is driven by hydraulic fluid discharged from the hydraulic pump. However, the driving power from the engine is also distributed to a travel device. As a result, the work vehicle travels due to the travel device being driven. Moreover, the engine rotation speed can be changed by an operator operating an accelerator operating member, such as an accelerator pedal (see, for example, Japanese Laid-open Patent 2004-144254).

The speed of the work implement is determined in accordance with the flow rate of hydraulic fluid supplied to the work implement. When the operator operates a work implement operating member, such as a work implement lever, the opening surface area of a work implement control valve is changed. As a result, the flow rate of the hydraulic fluid supplied to the work implement is changed. Moreover, in order to allow the hydraulic pump to be driven by the engine, the flow rate of the hydraulic fluid is also changed due to the engine rotation speed being changed. Therefore, the operator is able to adjust the speed of the work implement by operating the work implement operating member and the accelerator operating member.

SUMMARY

To increase the speed of the work implement, the operator, for example, tilts the work implement lever further and also steps on the accelerator pedal. As a result, the opening surface area of the work implement control valve is increased and the engine rotation speed is increased whereby the speed of the work implement can be increased. However, because the driving power from the engine is also distributed to the travel device, the vehicle speed increases when the engine rotation speed increases. As a result, the operator adjusts the speed of the work implement while suppressing the increase in the vehicle speed by operating a brake operating member, such as a brake pedal.

Consequently, the operator adjusts the speed of the work implement and the vehicle speed by operating the work implement operating member, the accelerator operating member, and the brake operating member at the same time. However, this type of complicated operation requires a high level of technique and is not easy.

An object of the present invention is to provide a work vehicle that is able to maintain balance between the speed of the work implement and the vehicle speed with a simple operation, and a method for controlling the work vehicle.

A work vehicle according to a first exemplary embodiment of the present invention is equipped with an engine, a hydraulic pump, a work implement, a travel device, an accelerator operating member, a work implement operating member, and a control unit. The hydraulic pump is driven by the engine. The work implement is driven by hydraulic fluid discharged from the hydraulic pump. The travel device is driven by the engine. The accelerator operating member is a member for an operator to change the engine rotation speed. The work implement operating member is a member for operating the work implement. The control unit causes the speed of the work implement to increase by causing the engine rotation speed to increase when an operation amount of the work implement operating member is increased.

The work vehicle according to the present exemplary embodiment enables the engine rotation speed to be increased automatically by the control unit when an operator operates the work implement operating member. As a result, the operator is able to adjust the speed of the work implement by operating the work implement operating member without operating the accelerator operating member. As a result, the speed of the work implement and the vehicle speed can be adjusted with a simple operation.

The work vehicle is preferably further equipped with a power transmission device. The power transmission device has an input shaft, an output shaft and a motor and transmits driving power from the engine to the travel device. The power transmission device is configured to change a rotation speed ratio of the output shaft with respect to the input shaft by changing the rotation speed of the motor. The control unit controls the tractive force of the vehicle by controlling the output torque of the motor.

In this case, an increase in the tractive force of the vehicle can be suppressed due to the control unit controlling the output torque of the motor even when the engine rotation speed is increased due to an increase in the speed of the work implement. As a result, the operator is able to adjust the speed of the work implement by operating the work implement operating member without performing an operation to suppress the increase in the vehicle speed. As a result, the speed of the work implement and the vehicle speed can be adjusted with a simple operation.

The control unit preferably determines a required tractive force which is a target tractive force of the travel device on the basis of the operation amount of the accelerator operating member and controls the output torque of the motor so that the tractive force of the vehicle becomes the required tractive force. In this case, the vehicle speed can be adjusted in response to the operation amount of the accelerator operating member even when the engine rotation speed increases due to an increase in the speed of the work implement.

The control unit preferably causes a discharge capacity of the hydraulic pump to increase in response to an increase in the operation amount of the work implement operating member when the operation amount of the work implement operating member is equal to or less than a predetermined operation amount. The discharge capacity of the hydraulic pump becomes the maximum capacity when the operation amount of the work implement operating member is the predetermined operation amount. The control unit causes the engine rotation speed to be increased in response to an increase in the operation amount of the work implement operating member when the operation amount of the work implement operating member is greater than the predetermined operation amount.

The capacity in the present description signifies the amount of hydraulic fluid discharged for each one rotation of the hydraulic pump. Moreover, the flow rate signifies the amount of hydraulic fluid discharged by the hydraulic pump per unit of time.

In this case, the speed of the work implement is controlled by controlling the discharge capacity of the hydraulic pump until the discharge capacity of the hydraulic pump becomes the maximum capacity. The speed of the work implement is controlled with the engine rotation speed when the discharge capacity of the hydraulic pump reaches the maximum capacity. Accordingly, fuel consumption can be improved.

The control unit preferably has a storage unit for storing required flow rate information which defines the relationship between the operation amount of the work implement operating member and the required flow rate to the hydraulic pump. The control unit determines the required flow rate corresponding to the operation amount of the work implement operating member by referring to the required flow rate information. The control unit determines the engine rotation speed on the basis of the required flow rate and the discharge capacity of the hydraulic pump. In this case, the engine rotation speed can be determined so that the speed of the work implement that corresponds to the operation amount of the work implement operating member is obtained.

The work vehicle is preferably further provided with a work implement control valve and a capacity control device. The work implement control valve controls the hydraulic pressure supplied to the work implement. The capacity control device includes a load sensing valve and controls the discharge capacity of the hydraulic pump so that a differential pressure between the discharge pressure of the hydraulic pump and the outlet hydraulic pressure of the work implement control valve becomes a predetermined value. When the discharge capacity of the hydraulic pump is controlled by the flow rate control device having the load sensing valve, the differential pressure of the work implement control valve needs to be compensated. The control unit as described above determines the engine rotation speed on the basis of the required flow rate and the discharge capacity of the hydraulic pump whereby the rotation speed of the engine can be determined in consideration of the required flow rate and an increase output amount for compensating the differential pressure of the work implement control valve.

The control unit preferably causes the required tractive force to fall below a value determined on the basis of the operation amount of the accelerator operating member when the engine rotation speed is increased in response to the increase in the operation amount of the work implement operating member. In this case, a behavior similar to a conventional work vehicle can be realized. That is, the driving power distributed to the travel device is reduced by increasing the driving power distributed to the hydraulic pump when the operator operates the work implement operating member in order to increase the speed of the work implement in the conventional work vehicle. As a result, the behavior of a reduction in the tractive force is brought about in the vehicle when the operator operates the work implement operating member. A sense of discomfort by the operator can be suppressed in the work vehicle according to the present embodiment by bringing about the behavior similar to the conventional work vehicle in this way.

The control unit preferably causes the required tractive force to be reduced so that the tractive force is further reduced in comparison to a tractive force before the operation of the work implement operating member. In this case, a sense of discomfort by the operator can be suppressed by bringing about the behavior similar to a conventional work vehicle.

The power transmission device preferably further includes a planetary gear mechanism. The control unit preferably causes the required tractive force to be reduced so that the tractive force is maintained regardless of the operation amount of the work implement operating member. The tractive force can be increased slightly due to inertia of the planetary gear mechanism connected to the engine when the engine rotation speed is increased in the work vehicle provided with the planetary gear mechanism. Therefore, the tractive force is greater in comparison to when the speed control is not performed when the engine rotation speed is increased due to speed control of the work implement being performed by controlling the engine rotation speed. Such an increase in the tractive force may impart a sense of discomfort to the operator.

Accordingly, by reducing the required tractive force so that the tractive force is maintained regardless of an operation of the work implement operating member, the tractive force is maintained at the amount before the operation of the work implement operating member even when the speed control of the work implement is performed by controlling the engine rotation speed. As a result, a sense of discomfort for the operator can be suppressed.

The control unit preferably causes the required tractive force to be reduced by multiplying the required tractive force by a predetermined reduction rate. In this case, the required tractive force can be reduced easily.

A control method for a work vehicle according to another exemplary embodiment of the present invention is a control method for a work vehicle equipped with an engine, a hydraulic pump, a work implement, a travel device, an accelerator operating member, and a work implement operating member. The hydraulic pump is driven by the engine. The work implement is driven by hydraulic fluid discharged from the hydraulic pump. The travel device is driven by the engine. The accelerator operating member is a member for an operator to change the engine rotation speed. The work implement operating member is a member for operating the work implement. The control method according to the present exemplary embodiment includes a step for causing the speed of the work implement to increase by causing the engine rotation speed to increase when an operation amount of the work implement operating member is increased.

The control method for the work vehicle according to the present exemplary embodiment allows the engine rotation speed to be increased automatically when an operator operates the work implement operating member. As a result, the operator is able to adjust the speed of the work implement by operating the work implement operating member without operating the accelerator operating member. As a result, the speed of the work implement and the vehicle speed can be adjusted with a simple operation.

A work vehicle that is able to maintain balance between the speed of the work implement and the vehicle speed with a simple operation, and a method for controlling the work vehicle can be provided.

DETAILED DESCRIPTION OF EXEMPLARY EMBODIMENTS

Figure 1:
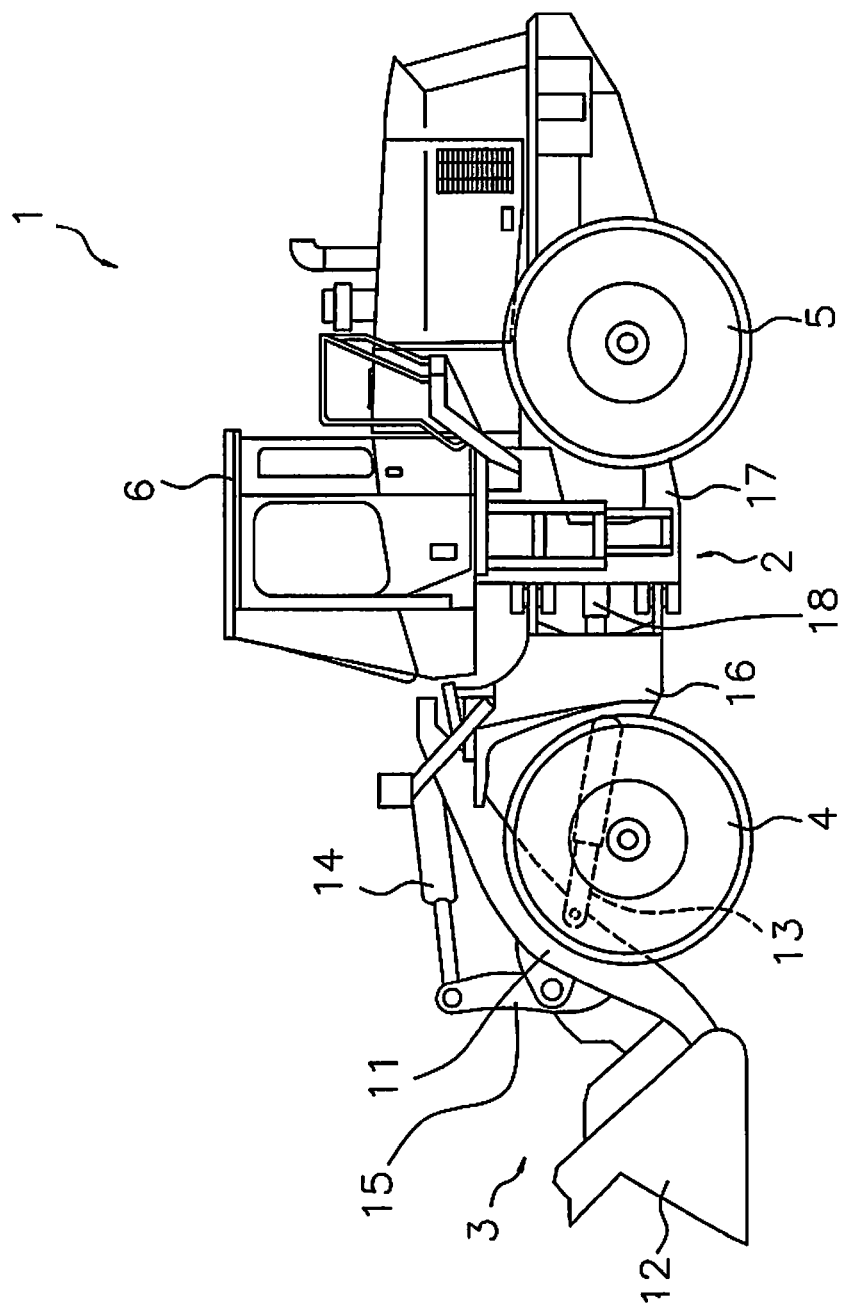
FIG. 1 is a side view of a work vehicle according to an exemplary embodiment.

Exemplary embodiments of the present invention will be explained in detail with reference to the figures. FIG. 1 is a side view of a work vehicle 1 according to an exemplary embodiment of the present invention. As illustrated in FIG. 1, the work vehicle 1 is equipped with a vehicle body frame 2, a work implement 3, traveling wheels 4 and 5, and an operating cabin 6. The work vehicle 1 is a wheel loader and travels due to the traveling wheels 4 and 5 being rotated and driven. The work vehicle 1 is able to carry out work, such as excavation, by using the work implement 3.

The work implement 3 and the traveling wheels 4 and 5 are attached to the vehicle body frame 2. The work implement 3 is driven by hydraulic fluid from a below-mentioned work implement pump 23 (see FIG. 2). The work implement 3 has a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 with hydraulic fluid from the work implement pump 23. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 with hydraulic fluid from the work implement pump 23.

The operating cabin 6 is attached to the vehicle body frame 2. The operating cabin 6 is mounted on the vehicle body frame 2. A seat for the operator and a below-mentioned operating device are disposed in the operating cabin 6. The vehicle body frame 2 has a front frame 16 and a rear frame 17. The front frame 16 and the rear frame 17 are attached to each other in a manner that allows swinging in the left-right direction.

The work vehicle 1 has a steering cylinder 18. The steering cylinder 18 is attached to the front frame 16 and the rear frame 17. The steering cylinder 18 is a hydraulic cylinder. The work vehicle 1 is able to change the advancing direction to the right and left with the extension and contraction of the steering cylinder 18 due to hydraulic fluid from a below-mentioned steering pump 30.

Figure 2:
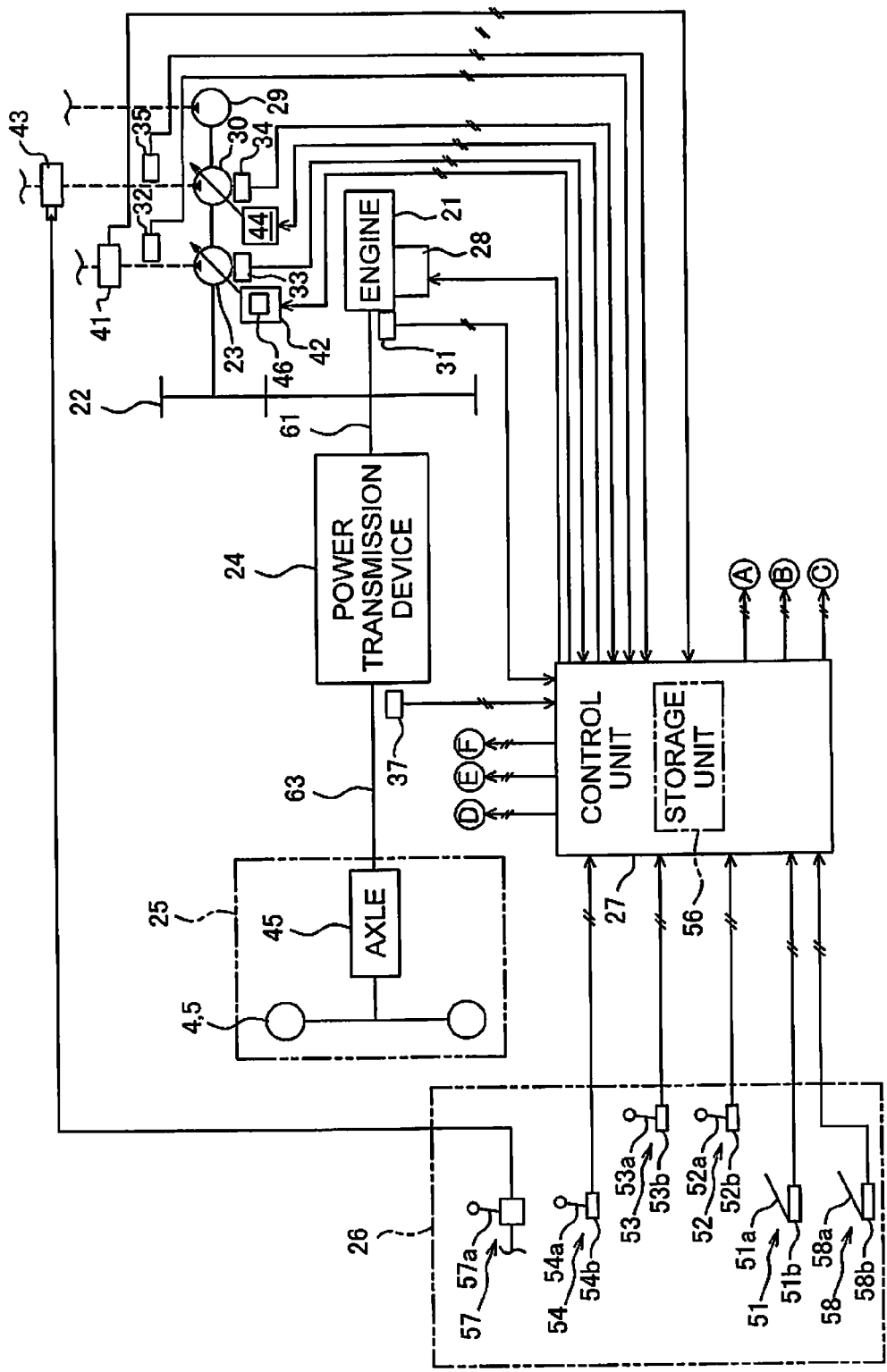
FIG. 2 is a schematic view of a configuration of the work vehicle.

FIG. 2 is a schematic view of a configuration of the work vehicle 1. As illustrated in FIG. 2, the work vehicle 1 is equipped with an engine 21, a power take-off device 22 (referred to below as a "PTO 22"), a power transmission device 24, a travel device 25, an operating device 26, and a control unit 27.

The engine 21 is, for example, a diesel engine. The output of the engine 21 is controlled by adjusting the amount of fuel injected into the cylinders of the engine 21. The adjustment of the amount of fuel is performed by the control unit 27 controlling a fuel injection device 28 attached to the engine 21. The work vehicle 1 is equipped with an engine rotation speed detecting unit 31. The engine rotation speed detecting unit 31 detects the engine rotation speed and transmits a detection signal indicating the engine rotation speed to the control unit 27.

The work vehicle 1 has the work implement pump 23, the steering pump 30, and a transmission pump 29. The work implement pump 23, the steering pump 30, and the transmission pump 29 are hydraulic pumps. The PTO 22 (power take-off) transmits a portion of the driving power from the engine 21 to the hydraulic pumps 23, 30, and 29. That is, the PTO 22 distributes the driving power from the engine 21 to the power transmission device 24 and the hydraulic pumps 23, 30, and 29.

The work implement pump 23 is driven by driving power from the engine 21. The hydraulic fluid discharged from the work implement pump 23 is supplied to the lift cylinder 13 and the bucket cylinder 14 through a work implement control valve 41. The work vehicle 1 is equipped with a work implement pump pressure detecting unit 32. The work implement pump pressure detecting unit 32 detects a discharge pressure (referred to below as "work implement pump pressure") of hydraulic fluid from the work implement pump 23 and transmits a detection signal indicating the work implement pump pressure to the control unit 27.

The work implement pump 23 is a variable displacement hydraulic pump. The discharge capacity of the work implement pump 23 is changed by changing the tilt angle of a skew plate or an inclined shaft of the work implement pump 23. A first capacity control device 42 is connected to the work implement pump 23. The first capacity control device 42 is controlled by the control unit 27 and changes the tilt angle of the work implement pump 23. As a result, the discharge capacity of the work implement pump 23 is controlled by the control unit 27. The work vehicle 1 is equipped with a first tilt angle detecting unit 33. The first tilt angle detecting unit 33 detects the tilt angle of the work implement pump 23 and transmits a detection signal indicating the tilt angle to the control unit 27.

The first capacity control device 42 has a load sensing valve 46 (referred to below as "LS valve 46"). The LS valve 46 controls the discharge capacity of the work implement pump 23 so that a differential pressure between a discharge pressure of the work implement pump 23 and an outlet hydraulic pressure of the work implement control valve 41 becomes a predetermined value. Specifically, the maximum outlet hydraulic pressure between the outlet hydraulic pressure to the lift cylinder 13 and the outlet hydraulic pressure to the bucket cylinder 14 is inputted to the LS valve 46. The LS valve 46 controls the discharge capacity of the work implement pump 23 so that a differential pressure between the discharge pressure of the work implement pump 23 and the maximum outlet hydraulic pressure becomes a predetermined value.

The steering pump 30 is driven by driving power from the engine 21. The hydraulic fluid discharged from the steering pump 30 is supplied to the above-mentioned steering cylinder 18 through a steering control valve 43. The work vehicle 1 is equipped with a steering pump pressure detecting unit 34. The steering pump pressure detecting unit 34 detects the discharge pressure (referred to below as "steering pump pressure") of hydraulic fluid from the steering pump 30 and transmits a detection signal indicating the steering pump pressure to the control unit 27.

The steering pump 30 is a variable displacement hydraulic pump. The discharge capacity of the steering pump 30 is changed by changing the tilt angle of a skew plate or an inclined shaft of the steering pump 30. A second capacity control device 44 is connected to the steering pump 30. The second capacity control device 44 is controlled by the control unit 27 and changes the tilt angle of the steering pump 30. As a result, the discharge capacity of the steering pump 30 is controlled by the control unit 27. The work vehicle 1 is equipped with a second tilt angle detecting unit 35. The second tilt angle detecting unit 35 detects the tilt angle of the steering pump 30 and transmits a detection signal indicating the tilt angle to the control unit 27.

The transmission pump 29 is driven by driving power from the engine 21. The transmission pump 29 is a fixed displacement hydraulic pump. Hydraulic fluid discharged from the transmission pump 29 is supplied to clutches CF, CR, CL, and CH of the power transmission device 24 via below-mentioned clutch control valves VF, VR, VL, and VH.

The PTO 22 transmits a portion of the driving power from the engine 21 to the power transmission device 24. The power transmission device 24 transmits the driving power from the engine 21 to the travel device 25. The power transmission device 24 changes the speed of the driving power from the engine 21 and outputs it. An explanation of the configuration of the power transmission device 24 is provided in detail below.

The travel device 25 has an axle 45 and the traveling wheels 4 and 5. The axle 45 transmits driving power from the power transmission device 24 to the traveling wheels 4 and 5. As a result, the traveling wheels 4 and 5 rotate. The work vehicle 1 is equipped with a vehicle speed detecting unit 37. The vehicle speed detecting unit 37 detects the rotation speed (referred to below as "output rotation speed") of an output shaft 63 of the power transmission device 24. The output rotation speed corresponds to the vehicle speed and consequently the vehicle speed detecting unit 37 detects the vehicle speed by detecting the output rotation speed. The vehicle speed detecting unit 37 detects the rotating direction of the output shaft 63. The rotating direction of the output shaft 63 corresponds to the traveling direction of the work vehicle 1 and consequently the vehicle speed detecting unit 37 functions as a traveling direction detecting unit that detects the traveling direction of the work vehicle 1 by detecting the rotating direction of the output shaft 63. The vehicle speed detecting unit 37 transmits detection signals indicating the output rotation speed and the rotating direction to the control unit 27.

The operating device 26 is operated by an operator. The operating device 26 has an accelerator operating device 51, a work implement operating device 52, a speed change operating device 53, a forward/reverse travel operating device 54 (referred to below as "FR operating device 54"), a steering operating device 57, and a brake operating device 58.

The accelerator operating device 51 has an accelerator operating member 51a and an accelerator operation detecting unit 51b. The accelerator operating member 51a is operated to set a target rotation speed of the engine 21. The rotation speed of the engine 21 is changed due to the accelerator operating member 51a being operated. The accelerator operation detecting unit 51b detects an operation amount (referred to below as "accelerator operation amount") of the accelerator operating member 51a. The accelerator operation detecting unit 51b transmits a detection signal indicating the accelerator operation amount to the control unit 27.

The work implement operating device 52 has a work implement operating member 52a and a work implement operation detecting unit 52b. The work implement operating member 52a is operated to actuate the work implement 3. The work implement operation detecting unit 52b detects a position of the work implement operating member 52a. The work implement operation detecting unit 52b outputs a detection signal indicating the position of the work implement operating member 52a to the control unit 27. The work implement operation detecting unit 52b detects an operation amount of the work implement operating member 52a (referred to below as "work implement operation amount") by detecting a position of the work implement operating member 52a.

The speed change operating device 53 has a speed change operating member 53a and a speed change operation detecting unit 53b. The operator is able to select a speed range of the power transmission device 24 by operating the speed change operating member 53a. The speed change operation detecting unit 53b detects a position of the speed change operating member 53a. The position of the speed change operating member 53a corresponds to a plurality of speed ranges, such as a first speed and a second speed and the like. The speed change operation detecting unit 53b outputs a detection signal indicating the position of the speed change operating member 53a to the control unit 27.

The FR operating device 54 has a forward/reverse travel operating member 54a (referred to below as "FR operating member 54a") and a forward/reverse travel position detecting unit 54b (referred to below as a "FR position detecting unit 54b"). The operator can switch between forward and reverse travel of the work vehicle 1 by operating the FR operating member 54a. The FR operating member 54a is selectively switched between a forward travel position (F), a neutral position (N), and a reverse travel position (R). The FR position detecting unit 54b detects a position of the FR operating member 54a. The FR position detecting unit 54b outputs a detection signal indicating the position of the FR operating member 54a to the control unit 27.

The steering operating device 57 has a steering operating member 57a. The steering operating device 57 drives the steering control valve 43 by supplying pilot hydraulic pressure based on an operation of the steering operating member 57a to the steering control valve 43. The steering operating device 57 may drive the steering control valve 43 by converting an operation of the steering operating member 57a to an electrical signal. The operator is able to change the travel direction of the work vehicle 1 to the right or left by operating the steering operating member 57a.

The brake operating device 58 has a brake operating member 58a and a brake operation detecting unit 58b. The operator is able to operate a braking force of the work vehicle 1 by operating the brake operating member 58a. The brake operation detecting unit 58b detects an operation amount of the brake operating member 58a (referred to below as "brake operation amount"). The brake operation detecting unit 58b outputs a detection signal indicating the brake operation amount to the control unit 27. The pressure of the brake oil may be used as the brake operation amount.

The control unit 27 has a calculation device, such as a CPU, and a memory, such as a RAM or a ROM, and conducts processing for controlling the work vehicle 1. The control unit 27 has a storage unit 56. The storage unit 56 stores programs and data for controlling the work vehicle 1.

The control unit 27 transmits a command signal indicating a command throttle value to the fuel injection device 28 so that a target rotation speed of the engine 21 is achieved in accordance with the accelerator operation amount. The control of the engine 21 by the control unit 27 is described in detail below.

The control unit 27 controls hydraulic pressure supplied to the hydraulic cylinders 13 and 14 by controlling the work implement control valve 41 on the basis of the detection signals from the work implement operation detecting unit 52b. As a result, the hydraulic cylinders 13 and 14 expand or contract to actuate the work implement 3.

Specifically, the storage unit 56 stores work implement control valve command value information which defines the relationship between the work implement operation amount and a command current value to the work implement control valve 41. For example, the work implement control valve command value information is a map which defines the relationship between the work implement operation amount and the command current value to the work implement control valve 41. The work implement control valve command value information may be a table or a formula or in another format other than a map. The opening surface area of the work implement control valve 41 is determined in response to the command current value. The work implement control valve command value information defines the command current value so that the opening surface area of the work implement control valve 41 increases in correspondence to an increase in the work implement operation amount. The control unit 27 refers to the work implement control valve command value information to determine the command current value to the work implement control valve 41 from the work implement operation amount.

The control unit 27 controls the power transmission device 24 on the basis of the detection signals from each of the detecting units. The control of the power transmission device 24 by the control unit 27 is described in detail below.

Figure 3:
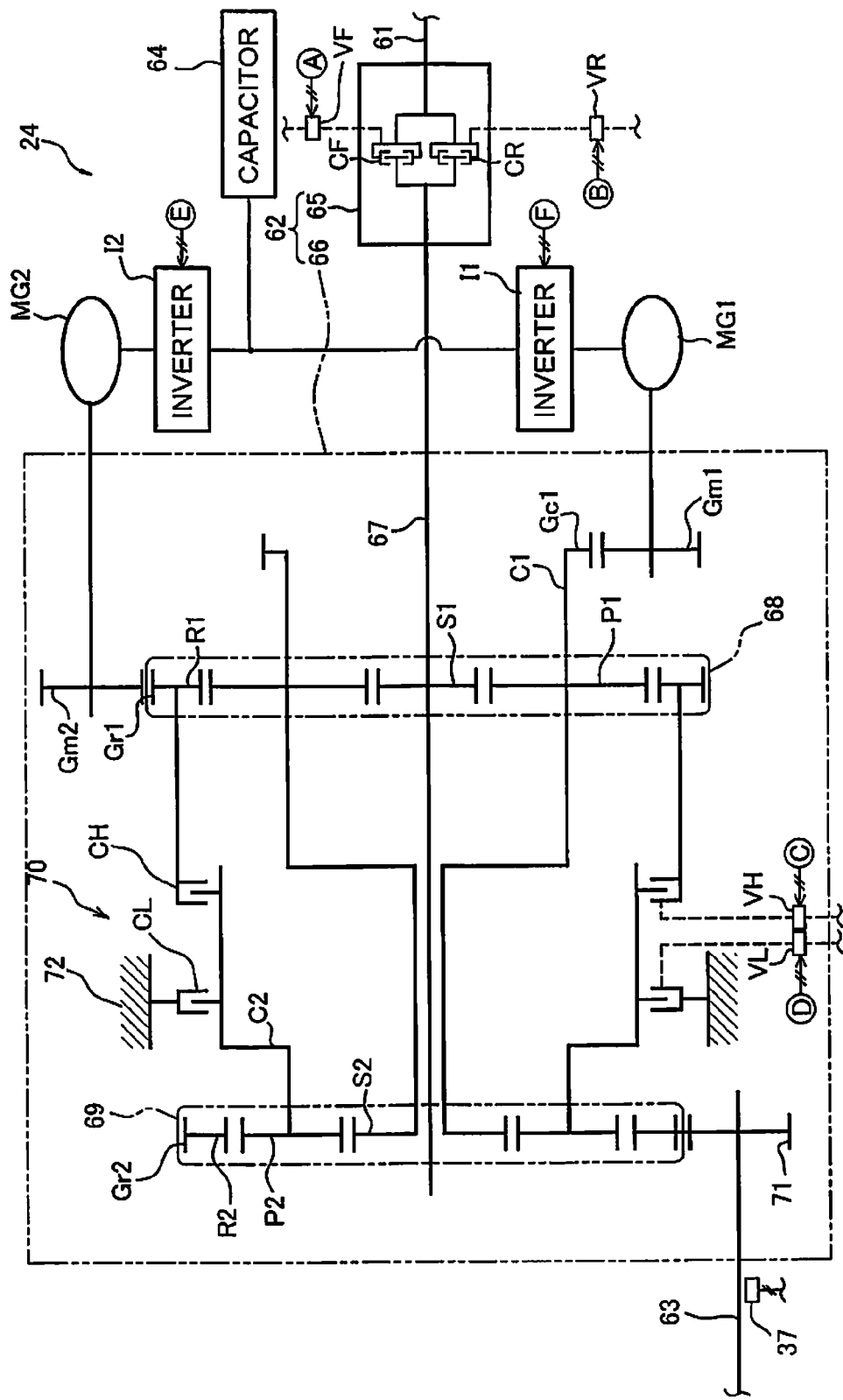
FIG. 3 is a schematic view of a configuration of a power transmission device.

Next, a detailed explanation of the configuration of the power transmission device 24 is provided. FIG. 3 is a schematic view of a configuration of the power transmission device 24. As illustrated in FIG. 3, the power transmission device 24 is provided with an input shaft 61, a gear mechanism 62, the output shaft 63, a first motor MG1, a second motor MG2, and a capacitor 64. The input shaft 61 is connected to the above-mentioned PTO 22. The rotation from the engine 21 is inputted to the input shaft 61 via the PTO 22. The gear mechanism 62 transmits the rotation of the input shaft 61 to the output shaft 63. The output shaft 63 is connected to the above-mentioned travel device 25 and transmits the rotation from the gear mechanism 62 to the above-mentioned travel device 25.

The gear mechanism 62 is a mechanism for transmitting driving power from the engine 21. The gear mechanism 62 is configured so that the rotation speed ratio of the output shaft 63 with respect to the input shaft 61 is changed in response to changes in the rotation speeds of the motors MG1 and MG2. The gear mechanism 62 has a FR switch mechanism 65 and a speed change mechanism 66.

The FR switch mechanism 65 has a forward travel clutch CF (referred to below as "F-clutch CF"), a reverse travel clutch CR (referred to below as "R-clutch CR"), and various other gears not illustrated. The F-clutch CF and the R-clutch CR are hydraulic clutches and hydraulic fluid is supplied from the transmission pump 29 to the clutches CF and CR. The hydraulic fluid for the F-clutch CF is controlled by an F-clutch control valve VF. The hydraulic fluid for the R-clutch CR is controlled by an R-clutch control valve VR. The clutch control valves VF and VR are controlled by command signals from the control unit 27.

The direction of the rotation outputted from the FR switch mechanism 65 is switched due to the switching between connected/disconnected states of the F-clutch CF and disconnected/connected states of the R-clutch CR. Specifically, the F-clutch CF is connected and the R-clutch CR is disconnected when the vehicle is traveling forward. The F-clutch CF is disconnected and the R-clutch CR is connected when the vehicle is traveling in reverse.

The speed change mechanism 66 has a transmission shaft 67, a first planetary gear mechanism 68, a second planetary gear mechanism 69, a Hi/Lo switch mechanism 70, and an output gear 71. The transmission shaft 67 is coupled to the FR switch mechanism 65. The first planetary gear mechanism 68 and the second planetary gear mechanism 69 are disposed on the same axis as the transmission shaft 67.

The first planetary gear mechanism 68 has a first sun gear S1, a plurality of first planet gears P1, a first carrier C1 that supports the plurality of first planet gears P1, and a first ring gear R1. The first sun gear S1 is coupled to the transmission shaft 67. The plurality of first planet gears P1 mesh with the first sun gear S1 and are supported in a rotatable manner by the first carrier C1. A first carrier gear Gc1 is provided on an outer peripheral part of the first carrier C1. The first ring gear R1 meshes with the plurality of first planet gears P1 and is able to rotate. A first ring outer periphery gear Gr1 is provided on the outer periphery of the first ring gear R1.

The second planetary gear mechanism 69 has a second sun gear S2, a plurality of second planet gears P2, a second carrier C2 that supports the plurality of second planet gears P2, and a second ring gear R2. The second sun gear S2 is coupled to the first carrier C1. The plurality of second planet gears P2 mesh with the second sun gear S2 and are supported in a rotatable manner by the second carrier C2. The second ring gear R2 meshes with the plurality of second planet gears P2 and is able to rotate. A second ring outer periphery gear Gr2 is provided on the outer periphery of the second ring gear R2. The second ring outer periphery gear Gr2 meshes with the output gear 71, and the rotation of the second ring gear R2 is outputted to the output shaft 63 via the output gear 71.

The Hi/Lo switch mechanism 70 is a mechanism for switching the driving power transmission path of the power transmission device 24 between a high-speed mode (Hi mode) in which the vehicle speed is high and a low-speed mode (Lo mode) in which the vehicle speed is low. The Hi/Lo switch mechanism 70 has an H-clutch CH that is connected during the Hi mode and an L-clutch CL that is connected during the Lo mode. The H-clutch CH engages or disengages the first ring gear R1 and the second carrier C2. The L-clutch CL engages or disengages the second carrier C2 and a fixed end 72 to prohibit or allow the rotation of the second carrier C2.

The clutches CH and CL are hydraulic clutches, and hydraulic fluid from the transmission pump 29 is supplied to each of the clutches CH and CL. The hydraulic fluid for the H-clutch CH is controlled by an H-clutch control valve VH. The hydraulic fluid for the L-clutch CL is controlled by an L-clutch control valve VL. The clutch control valves VH and VL are controlled by command signals from the control unit 27.

The first motor MG1 and the second motor MG2 function as drive motors that generate driving power using electrical energy. The first motor MG1 and the second motor MG2 also function as generators that use inputted driving power to generate electrical energy. The first motor MG1 functions as a generator when a command signal from the control unit 27 is applied to activate torque in the reverse direction of the rotating direction of the first motor MG1. A first motor gear Gm1 is fixed to the output shaft of the first motor MG1 and the first motor gear Gm1 meshes with the first carrier gear Gc1. A first inverter I1 is connected to the first motor MG1 and a command signal for controlling the motor torque of the first motor MG1 is applied to the first inverter I1 from the control unit 27.

The second motor MG2 is configured in the same way as the first motor MG1. A second motor gear Gm2 is fixed to the output shaft of the second motor MG2 and the second motor gear Gm2 meshes with the first ring outer periphery gear Gr1. A second inverter I2 is connected to the second motor MG2 and a command signal for controlling the motor torque of the second motor MG2 is applied to the second inverter I2 from the control unit 27.

The capacitor 64 functions as an energy reservoir unit for storing energy generated by the motors MG1 and MG2. That is, the capacitor 64 stores electrical power generated by the motors MG1 and MG2 when the total electrical power generation amount of the motors MG1 and MG2 is high. The capacitor 64 releases electrical power when the total electrical power consumption amount of the motors MG1 and MG2 is high. That is, the motors MG1 and MG2 are driven by electrical power stored in the capacitor 64. Alternatively, the motors MG1 and MG2 can drive using the electrical power stored in the capacitor 64. A battery may be used in place of a capacitor.

The control unit 27 receives detection signals from the various detecting units and applies command signals for indicating the command torques for the motors MG1 and MG2 to inverters I1 and I2. The control unit 27 may output rotation speed commands to the motors MG1 and MG2. In this case, the inverters I1 and I2 control the motors MG1 and MG2 by calculating command torques corresponding to the rotation speed commands. The control unit 27 also applies command signals for controlling the clutch hydraulic pressure of the clutches CF, CR, CH, and CL to the clutch control valves VF, VR, VH, and VL. As a result, the speed change ratio and the output torque of the power transmission device 24 are controlled. The following is an explanation of the operations of the power transmission device 24.

Figure 4:
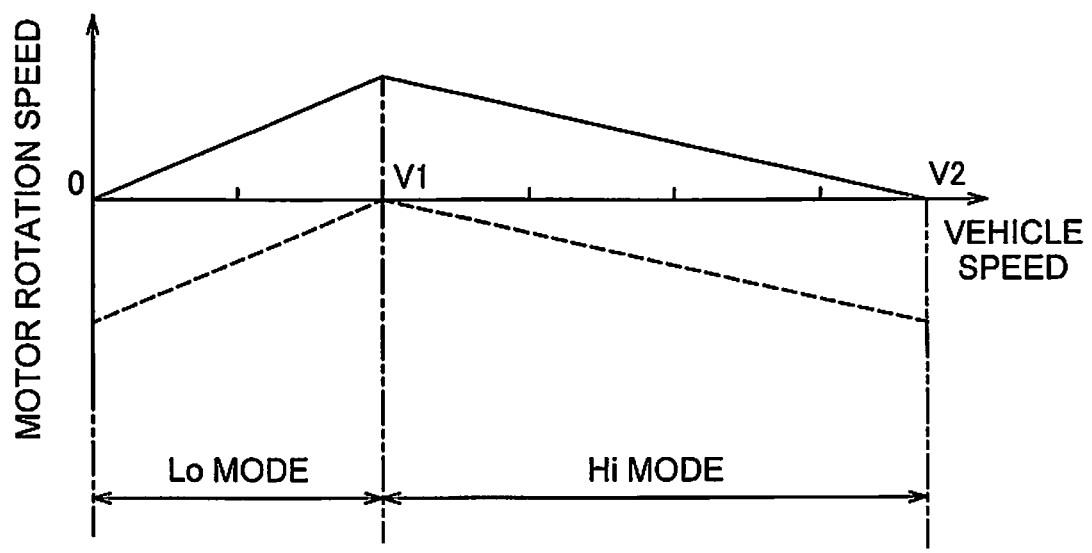
FIG. 4 illustrates changes in rotation speeds of a first motor and a second motor with respect to the vehicle speed.

An outline of operations of the power transmission device 24 when the vehicle speed increases from zero in the forward travel side while the rotation speed of the engine 21 remains fixed, will be explained with reference to FIG. 4. FIG. 4 illustrates the rotation speeds of the motors MG1 and MG2 with respect to the vehicle speed. When the rotation speed of the engine 21 is fixed, the vehicle speed changes in response to the rotation speed ratio of the power transmission device 24. The rotation speed ratio is the ratio of the rotation speed of the output shaft 63 with respect to the rotation speed of the input shaft 61. Therefore, the variation in the vehicle speed in FIG. 4 matches the variation of the rotation speed ratio of the power transmission device 24. That is, FIG. 4 illustrates the relationship between the rotation speeds of the motors MG1 and MG2 and the rotation speed ratio of the power transmission device 24. The solid line in FIG. 4 represents the rotation speed of the first motor MG1, and the dashed line represents the rotation speed of the second motor MG2.

The L-clutch CL is connected and the H-clutch CH is disconnected in the region which the vehicle speed is between zero and V1 inclusive (Lo mode). Because the H-clutch CH is disconnected in the Lo mode, the second carrier C2 and the first ring gear R1 are disconnected. Because the L-clutch CL is connected, the second carrier C2 is fixed.

The driving power from the engine 21 in the Lo mode is inputted to the first sun gear S1 via the transmission shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. The second motor MG2 functions mainly as a generator in the Lo mode, and a portion of the electrical power generated by the second motor MG2 is stored in the capacitor 64. A portion of the electrical power generated by the second motor MG2 is consumed in the driving of the first motor MG1.

The first motor MG1 functions mainly as an electric motor in the Lo mode. The driving power of the first motor MG1 is outputted to the second sun gear S2 along a path from the first motor gear Gm1 to the first carrier gear Gc1 to the first carrier C1. The driving power outputted to the second sun gear S2 as described above is transmitted to the output shaft 63 along a path from the second planet gears P2 to the second ring gear R2 to the second ring outer periphery gear Gr2 to the output gear 71.

The H-clutch CH is connected and the L-clutch CL is disconnected in the region in which the vehicle speed exceeds V1 (Hi mode). Because the H-clutch CH is connected in the Hi mode, the second carrier C2 and the first ring gear R1 are connected. Because the L-clutch CL is disconnected, the second carrier C2 is disconnected. Therefore, the rotation speeds of the first ring gear R1 and the second carrier C2 match.

The driving power from the engine 21 in the Hi mode is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1. The first motor MG1 functions mainly as a generator in the Hi mode, and thus a portion of the electrical power generated by the first motor MG1 is stored in the capacitor 64. A portion of the electrical power generated by the first motor MG1 is consumed in the driving of the second motor MG2.

The driving power of the second motor MG2 is outputted to the second carrier C2 along a path from the second motor gear Gm2 to the first ring outer periphery gear Gr1 to the first ring gear R1 to the H-clutch CH. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power combined by the second ring gear R2 in this way is transmitted through the second ring outer periphery gear Gr2 and the output gear 71 to the output shaft 63.

While forward travel driving has been discussed above, the operations of reverse travel driving are the same. During braking, the roles of the first motor MG1 and the second motor MG2 as generator and motor are reversed from the above explanation.

The control of the power transmission device 24 by the control unit 27 is described in detail below. The control unit 27 controls the output torque of the power transmission device 24 by controlling the motor torque of the first motor MG1 and the second motor MG2. That is, the control unit 27 controls the tractive force of the work vehicle 1 by controlling the motor torque of the first motor MG1 and the second motor MG2. A method for determining the command values (referred to below as "command torques") of the motor torques to the first motor MG1 and the second motor MG2 is explained below.

Figure 5:
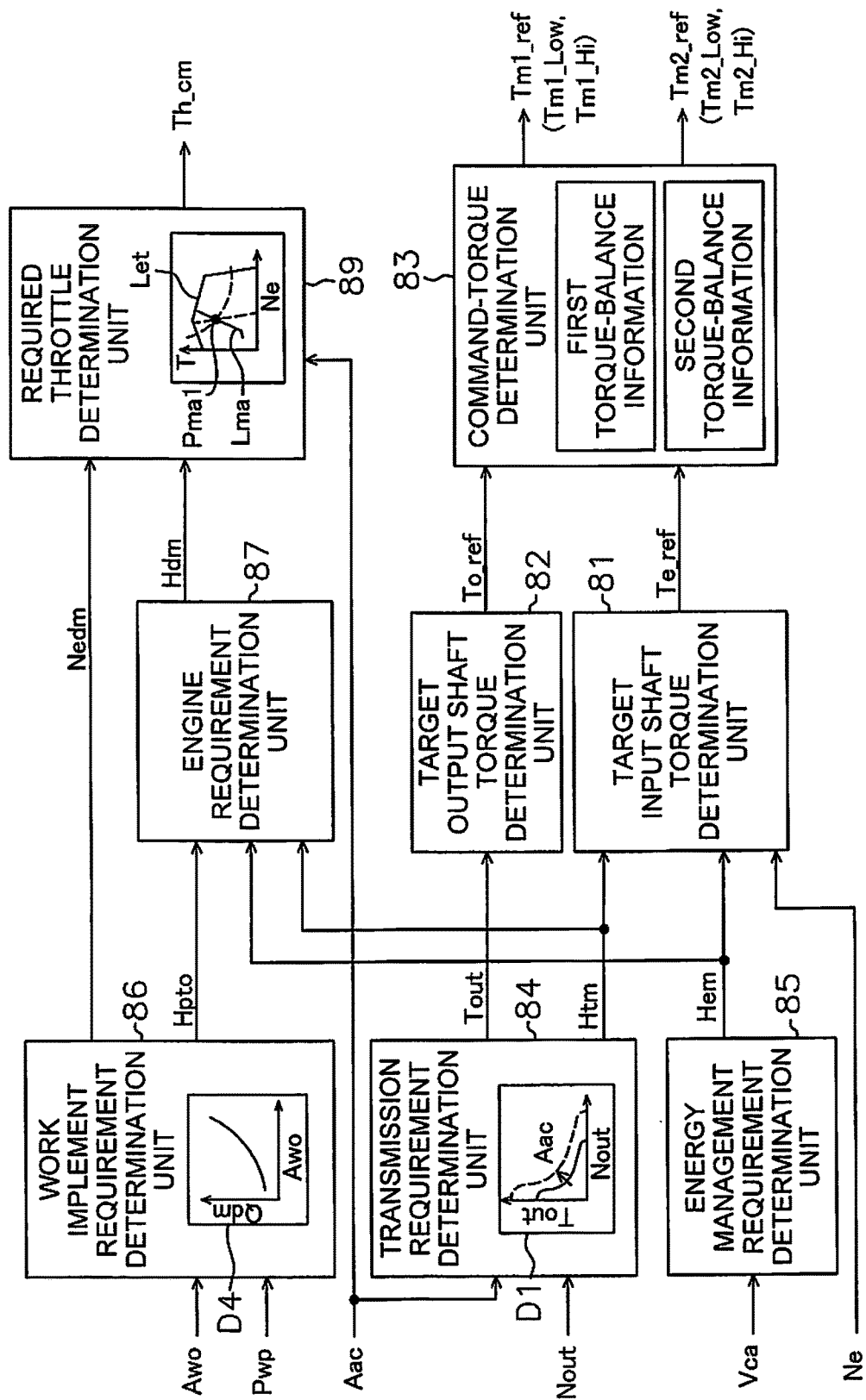
FIG. 5 is a block diagram illustrating a process for determining command torques for the motors.

FIG. 5 is a control block diagram illustrating processing executed by the control unit 27. The control unit 27 has a transmission requirement determination unit 84, an energy management requirement determination unit 85, and a work implement requirement determination unit 86 as illustrated in FIG. 5.

The transmission requirement determination unit 84 determines a required tractive force Tout on the basis of an accelerator operation amount Aac and an output rotation speed Nout. Specifically, the transmission requirement determination unit 84 determines the required tractive force Tout from the output rotation speed Nout on the basis of required tractive force characteristics information D1 stored in the storage unit 56. The required tractive force characteristics information D1 is data indicating the required tractive force characteristics for defining the relationship between the output rotation speed Nout and the required tractive force Tout.

Figure 6:
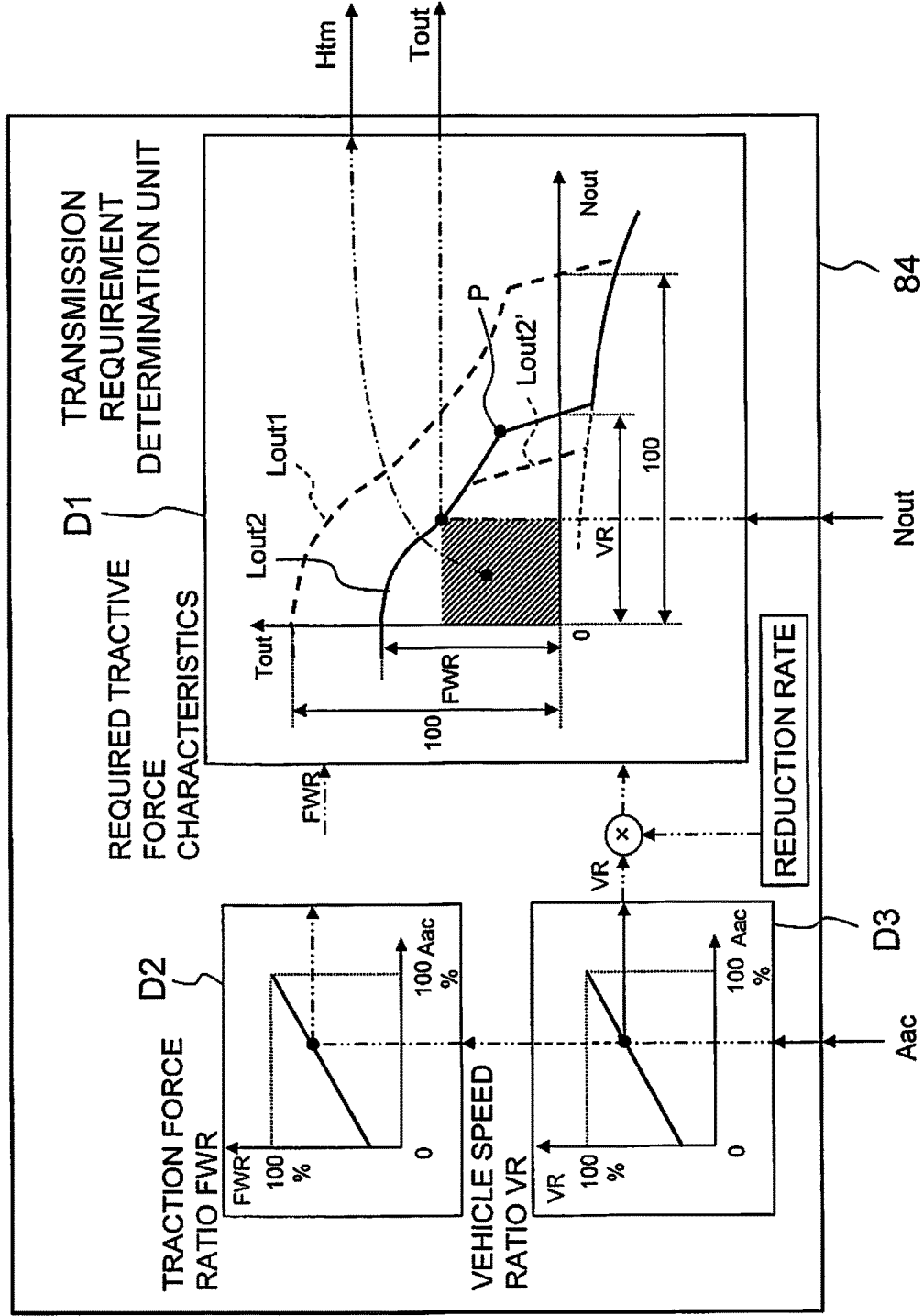
FIG. 6 is a block diagram illustrating processing by a transmission requirement determination unit.

Specifically as illustrated in FIG. 6, the storage unit 56 stores data Lout1 (referred to below as "basic tractive force characteristics Lout1") indicating basic required tractive force characteristics. The basic tractive force characteristics Lout1 are required tractive force characteristics when the accelerator operation amount Aac is at the maximum value, that is, at 100%. The basic tractive force characteristics Lout1 are determined in response to a speed range selected with the speed change operating member 53a. The transmission requirement determination unit 84 determines current required tractive force characteristics Lout2 by multiplying a tractive force ratio FWR and a vehicle speed ratio VR by the basic tractive force characteristics Lout1.

The storage unit 56 stores tractive force ratio information D2 and vehicle speed ratio information D3. The tractive force ratio information D2 defines the tractive force ratio FWR with respect to the accelerator operation amount Aac. The vehicle speed ratio information D3 defines the vehicle speed ratio VR with respect to the accelerator operation amount Aac. The transmission requirement determination unit 84 determines the tractive force ratio FWR and the vehicle speed ratio VR in response to the accelerator operation amount Aac. The transmission requirement determination unit 84 determines the current required tractive force characteristics Lout2 in response to the accelerator operation amount Aac by multiplying the basic tractive force characteristics Lout1 by the tractive force ratio FWR in the vertical axis direction which indicates the required tractive force and the vehicle speed ratio VR in the horizontal axis direction which indicates the output rotation speed Nout.

The tractive force ratio information D2 defines the tractive force ratio FWR that increases in correspondence to an increase in the accelerator operation amount Aac. The vehicle speed ratio information D3 defines the vehicle speed ratio VR which increases in correspondence to an increase in the accelerator operation amount Aac. However, the tractive force ratio FWR is greater than zero when the accelerator operation amount is zero. Similarly, the vehicle speed ratio VR is greater than zero when the accelerator operation amount Aac is zero. As a result, the required tractive force Tout is a value greater than zero even when the accelerator operating member 51a is not being operated. That is, tractive force is being outputted from the power transmission device 24 even when the accelerator operating member 51a is not being operated. As a result, a behavior similar to creep generated in a torque converter-type speed change device is materialized in the EMT-type power transmission device 24.

The required tractive force characteristics information D1 defines the required tractive force Tout that increases in response to a reduction in the output rotation speed Nout. When the above-mentioned speed change operating member 53a is operated, the transmission requirement determination unit 84 changes the required tractive force characteristics in response to the speed range selected by the speed change operating member 53a. For example, when a down-shift is conducted using the speed change operating member 53a, the required tractive force characteristics information changes from Lout2 to Lout2' as illustrated in FIG. 6. As a result, the upper limit of the output rotation speed Nout is reduced. That is, the upper limit of the vehicle speed is reduced.

The required tractive force characteristics information D1 defines the required tractive force Tout as a negative value with respect to the output rotation speed Nout that is no less than the predetermined speed. As a result, the required tractive force Tout is determined to be a negative value when the output rotation speed Nout is larger than the upper limit of the output rotation speed in the selected speed range. A braking force is generated when the required tractive force Tout is a negative value. As a result, a behavior similar to engine brake generated in a torque converter-type speed change device is materialized in the EMT-type power transmission device 24.

The energy management requirement determination unit 85 illustrated in FIG. 5 determines an energy management required horsepower Hem on the basis of a remaining amount of electrical power in the capacitor 64. The energy management required horsepower Hem is a horsepower required by the power transmission device 24 for charging the capacitor 64. The energy management requirement determination unit 85 determines a current capacitor capacity from a voltage Vca of the capacitor 64. The energy management requirement determination unit 85 increases the energy management required horsepower Hem as the current capacitor capacity becomes smaller.

The work implement requirement determination unit 86 determines a work implement required horsepower Hpto on the basis of a work implement pump pressure Pwp and an operation amount Awo (referred to below as "work implement operation amount Awo") of the work implement operating member 52a. In the present exemplary embodiment, the work implement required horsepower Hpto is a horsepower distributed to the work implement pump 23. However, the work implement required horsepower Hpto may include a horsepower distributed to the steering pump 30 and/or the transmission pump 29.

Specifically, the work implement requirement determination unit 86 determines a required flow rate Qdm of the work implement pump 23 from the work implement operation amount Awo on the basis of required flow rate information D4. The required flow rate information D4 is stored in the storage unit 56 and defines the relationship between the required flow rate Qdm and the work implement operation amount Awo. The required flow rate information D4 defines the relationship between the required flow rate Qdm and the work implement operation amount Awo so that the required flow rate Qdm increases in correspondence with an increase in the work implement operation amount Awo. The work implement requirement determination unit 86 determines the work implement required horsepower Hpto from the required flow rate Qdm and the work implement pump pressure Pwp.

Furthermore, the work implement requirement determination unit 86 determines a work implement required engine rotation speed Nedm on the basis of the required flow rate Qdm and the discharge capacity of the work implement pump 23. Specifically, the work implement requirement determination unit 86 determines a work implement required pump rotation speed by dividing the required flow rate Qdm by the discharge capacity of the work implement pump 23. The work implement requirement determination unit 86 then determines the work implement required engine rotation speed Nedm from the work implement required pump rotation speed in consideration of the factors such as the number of teeth of the rotating elements and the transmission efficiency between the engine 21 and the work implement pump 23.

The control unit 27 has a target output shaft torque determining unit 82, a target input shaft torque determining unit 81, and a command-torque determination unit 83.

The target output shaft torque determining unit 82 determines a target output shaft torque To_ref. The target output shaft torque To_ref is a target value for the torque to be outputted from the power transmission device 24. The target output shaft torque determining unit 82 determines the target output shaft torque To_ref on the basis of the required tractive force Tout determined by the transmission requirement determination unit 84. That is, the target output torque To_ref is determined so that the tractive force outputted from the power transmission device 24 obeys the required tractive force characteristics defined by the force characteristics information D1. Specifically, the target output shaft torque To_ref is determined by multiplying the required tractive force Tout by a predetermined distribution ratio. The predetermined distribution ratio is set, for example, so that the total of the work implement required horsepower Hpto, the transmission required horsepower Htm, and the energy management required horsepower Hem does not exceed the output horsepower from the engine 21.

The target input shaft torque determining unit 81 determines a target input shaft torque Te_ref. The target input shaft torque Te_ref is a target value for the torque to be inputted to the power transmission device 24. The target input shaft torque determining unit 81 determines the target input shaft torque Te_ref on the basis of the transmission required horsepower Htm and the energy management required horsepower Hem. Specifically, the target input shaft torque determining unit 81 calculates the target input shaft torque Te_ref by multiplying the engine rotation speed by the sum of the energy management required horsepower Hem and the value of the transmission required horsepower Htm multiplied by the predetermined distribution ratio. The transmission required horsepower Htm is calculated by multiplying the above-mentioned required tractive force Tout by the current output rotation speed Nout.

The command-torque determination unit 83 uses torque-balance information to determine command torques Tm1_ref and Tm2_ref to the motors MG1 and MG2 from the target input shaft torque Te_ref and the target output shaft torque To_ref. The torque-balance information defines a relationship between the target input shaft torque Te_ref and the target output shaft torque To_ref to achieve a balance among the torques of the power transmission device 24. The torque-balance information is stored in the storage unit 56.

As described above, the transmission paths of the driving power in the power transmission device 24 are different for the Lo mode and the Hi mode. As a result, the command-torque determination unit 83 uses different torque-balance information to determine the command torques Tm1_ref and Tm2_ref for the motors MG1 and MG2 in the Lo mode and the Hi mode. Specifically, the command-torque determination unit 83 uses first torque-balance information represented by equation 1 below to determine command torques Tm1_Low and Tm2_Low for the motors MG1 and MG2 in the Lo mode. In the present exemplary embodiment, the first torque-balance information is an equation for balancing the torques of the power transmission device 24.

$$Ts1\_Low = Te\_ref * r\_fr$$

$$Tc1\_Low = Ts1\_Low * (-1) * ((Zr1/Zs1) + 1)$$

$$Tr2\_Low = To\_ref * (Zod/Zo)$$

$$Ts2\_Low = Tr2\_Low * (Zs2/Zr2)$$

$$Tcp1\_Low = Tc1\_Low + Ts2\_Low$$

$$Tm1\_Low = Tcp1\_Low * (-1) * (Zp1/Zp1d)$$

$$Tr1\_Low = Ts1\_Low * (Zr1/Zs1)$$

$$Tm2\_Low = Tr1\_Low * (-1) * (Zp2/Zp2d) \quad \text{(Equation 1)}$$

The command-torque determination unit 83 uses second torque-balance information represented by equation 2 below to determine command torques Tm1_Hi and Tm2_Hi for the motors MG1 and MG2 in the Hi mode. In the present exemplary embodiment, the second torque-balance information is an equation for balancing the torques of the power transmission device 24.

$$Ts1\_Hi = Te\_ref * r\_fr$$

$$Tc1\_Hi = Ts1\_Hi * (-1) * ((Zr1/Zs1) + 1)$$

$$Tr2\_Hi = To\_ref * (Zod/Zo)$$

$$Ts2\_Hi = Tr2\_Hi * (Zs2/Zr2)$$

$$Tcp1\_Hi = Tc1\_Hi + Ts2\_Hi$$

$$Tm1\_Hi = Tcp1\_Hi * (-1) * (Zp1/Zp1d)$$

$$Tr1\_Hi = Ts1\_Hi * (Zr1/Zs1)$$

$$Tc2\_Hi = Tr2\_Hi * (-1) * ((Zs2/Zr2) + 1)$$

$$Tcp2\_Hi = Tr1\_Hi + Tc2\_Hi$$

$$Tm2\_Hi = Tcp2\_Hi * (-1) * (Zp2/Zp2d) \quad \text{(Equation 2)}$$

The contents of the parameters in each torque-balance information are depicted in Table 1 below.

TABLE 1

| | |
|---|---|
| Te_ref | Target input shaft torque |
| To_ref | Target output shaft torque |
| r_fr | Deceleration ratio for the FR switch mechanism 65 (The FR switch mechanism 65 decelerates the engine rotation speed at 1/r_fr and output it. When the FR switch mechanism 65 is in the forward travel state, r_fr is a negative value. When the FR switch mechanism 65 is in the reverse travel state, r_fr is a positive value.) |
| Zs1 | Number of teeth of the sun gear S1 in the first planetary gear mechanism 68. |
| Zr1 | Number of teeth of the ring gear R1 in the first planetary gear mechanism 68. |
| Zp1 | Number of teeth in the first carrier gear Gc1 |
| Zp1d | Number of teeth of the first motor gear Gm1 |
| Zs2 | Number of teeth of the sun gear S2 in the second planetary gear mechanism 69. |
| Zr2 | Number of teeth of the ring gear R2 in the second planetary gear mechanism 69. |
| Zp2 | Number of teeth of the first ring outer periphery gear Gr1 |
| Zp2d | Number of teeth of the second motor gear Gm2 |
| Zo | Number of teeth of the second ring outer periphery gear Gr2 |
| Zod | Number of teeth of the output gear 71 |

The control of the engine 21 by the control unit 27 is described in detail below. As described above, the control unit 27 controls the engine by transmitting command signals to the fuel injection device 28. A method for determining the command throttle values for the fuel injection device 28 will be explained below. The control unit 27 has an engine requirement determination unit 87 and a required throttle determination unit 89.

The engine requirement determination unit 87 determines an engine required horsepower Hdm on the basis of the work implement required horsepower Hpto, the transmission required horsepower Htm, and the energy management required horsepower Hem. Specifically, the engine requirement determination unit 87 determines the engine required horsepower Hdm by adding the work implement required horsepower Hpto, the transmission required horsepower Htm, and the energy management required horsepower Hem.

Figure 7:
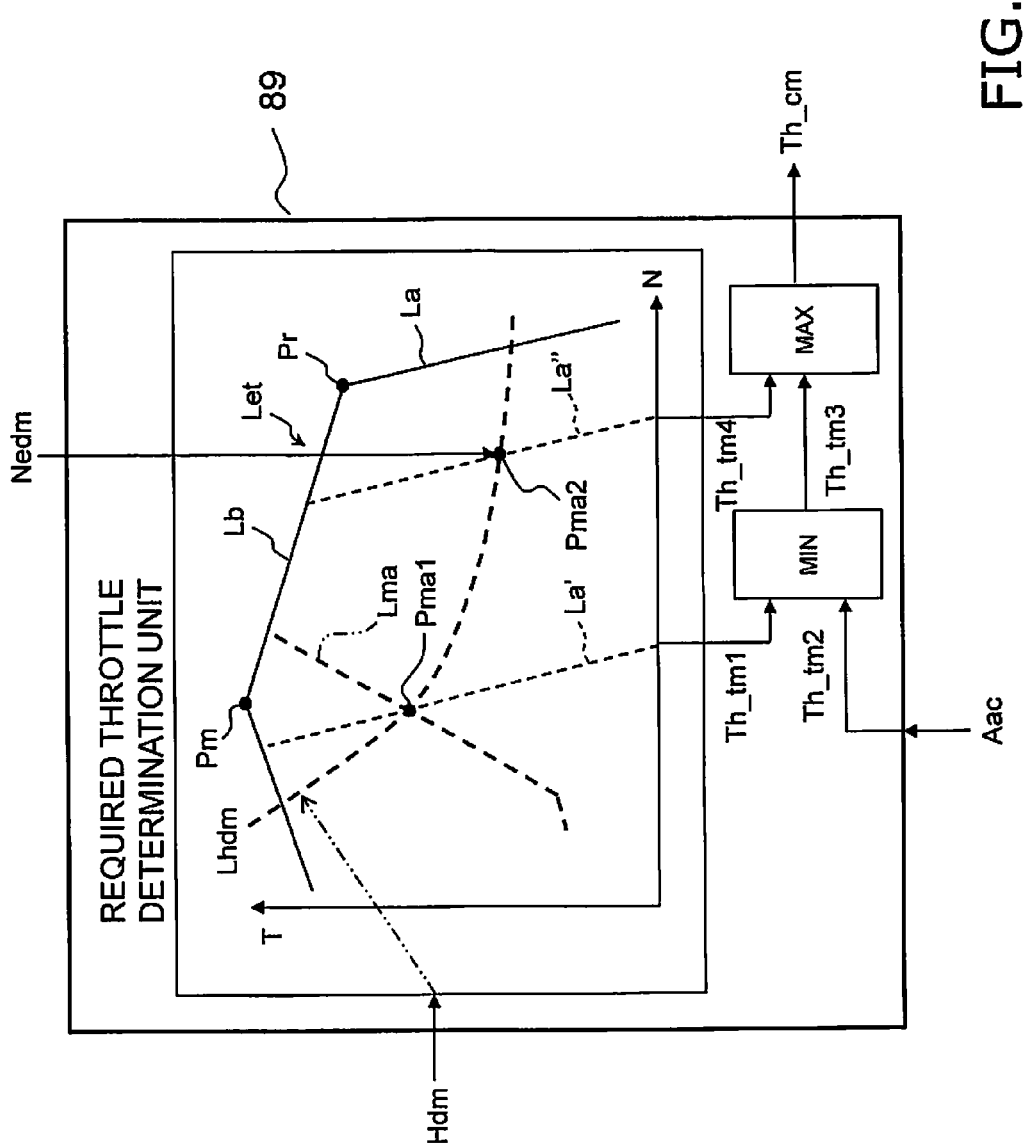
FIG. 7 is a block diagram illustrating processing by a required throttle determination unit.

The required throttle determination unit 89 determines a command throttle value Th_cm from the engine required horsepower Hdm, the accelerator operation amount Aac, and the work implement required engine rotation speed Nedm. Specifically, the storage unit 56 stores an engine torque line Let and a matching line Lma as illustrated in FIG. 7. The engine torque line Let defines a relationship between the output torque of the engine 21 and the engine rotation speed Ne. The engine torque line Let includes a regulation region La and a full load region Lb. The regulation region La changes in response to the command throttle value Th_cm (see La' in FIG. 7). The full load region Lb includes a rated point Pr and a maximum torque point Pm located on the low engine rotation speed side from the rated point Pr.

The matching line Lma is information for determining a first required throttle value Th_tm1 from the engine required horsepower Hdm. While the matching line Lma can be set optionally, the matching line Lma in the present embodiment is set so as to pass through a position closer to the maximum torque point Pm than the rated point Pr in the full load region Lb of the engine torque line Let.

The required throttle determination unit 89 determines the first required throttle value Th_tm1 so that the engine torque line Let and the matching line Lma match at a matching point Pm1 where the output torque of the engine 21 becomes the torque corresponding to the engine required horsepower Hdm. That is, the intersection of the matching line Lma and an equivalent horsepower line Lhdm corresponding to the engine required horsepower Hdm is set as a first matching point Pma1, and the required throttle determination unit 89 determines the first required throttle value Th_tm1 so that the regulation region (see "La") of the engine torque line Let passes through the first matching point Pma1.

The required throttle determination unit 89 determines the lowest of the first required throttle value Th_tm1 and a second required throttle value Th_tm2 corresponding to the accelerator operation amount Aac, as a third command throttle value Th_tm3. Moreover, when a below-mentioned speed control of the work implement 3 due to the engine rotation speed is performed, the required throttle determination unit 89 determines a fourth required throttle value Th_tm4 on the basis of the work implement required engine rotation speed Nedm. Specifically, the required throttle determination unit 89 determines the fourth required throttle value Th_tm4 so that the regulation region (see La") of the engine torque line Let passes through a point Pma2 in which the engine rotation speed becomes the work implement required engine rotation speed Nedm on the equivalent horsepower line Lhdm. The required throttle determination unit 89 determines the largest of the third command throttle value Th_tm3 and the fourth required throttle value Th_tm4 as the command throttle value Th_cm. When the speed control of the work implement 3 is not performed using the engine rotation speed, the required throttle determination unit 89 determines the third command throttle value Th_tm3 as the command throttle value Th_cm.

Figure 8:
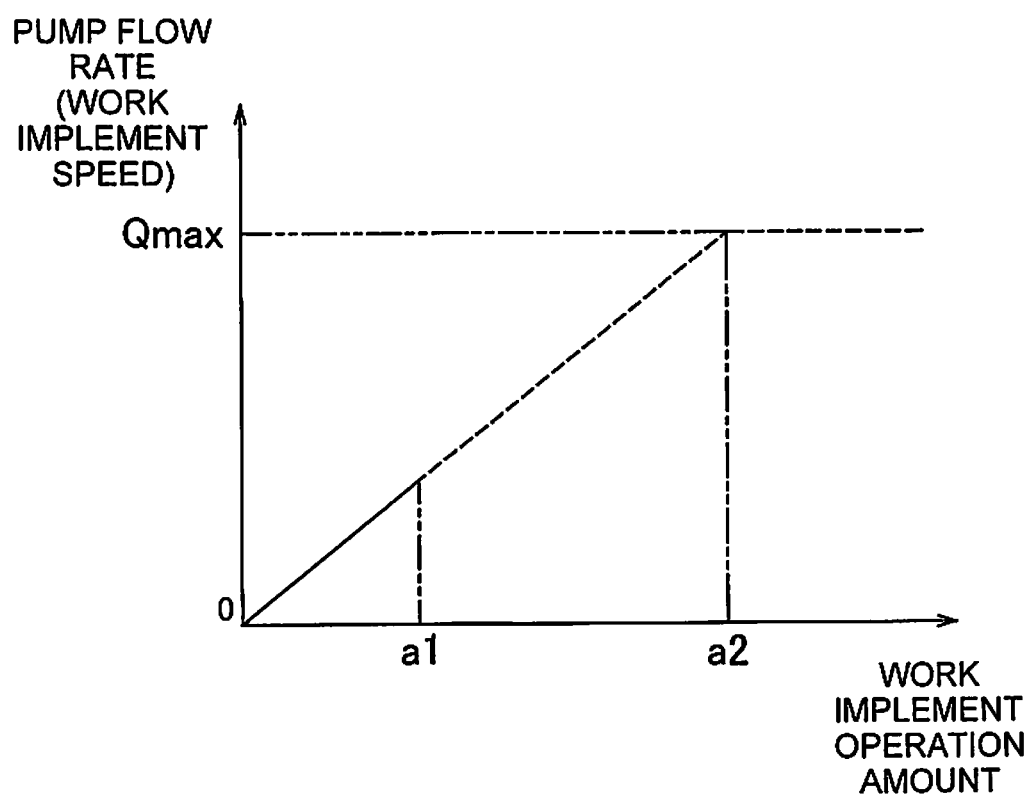
FIG. 8 is a graph illustrating a relationship between an operation amount and a discharge flow rate of a work implement pump.

The following is an explanation of the speed control of the work implement 3. FIG. 8 is a graph illustrating a relationship between the work implement operation amount and the discharge flow rate of the work implement pump 23. The speed of the work implement 3 increases in correspondence to an increase in the discharge flow rate of the work implement pump 23. Therefore, changes in the discharge flow rate of the work implement pump 23 in FIG. 8 illustrate changes in the speed of the work implement 3. The relationship between the work implement operation amount and the discharge flow rate of the work implement pump may be modified and is not necessarily the linear shape depicted in FIG. 8.

As illustrated in FIG. 8, the control unit 27 causes the discharge flow rate of the work implement pump 23 to be increased in response to an increase in the work implement operation amount. The control unit 27 controls the opening surface area of the work implement control valve 41 by determining the command current value for the work implement control valve 41 in response to the work implement operation amount. As described above, the first capacity control device 42 uses the LS valve 46 to control the discharge capacity of the work implement pump 23 so that the differential pressure between the discharge pressure of the work implement pump 23 and the outlet hydraulic pressure of the work implement control valve 41 becomes a predetermined value. When the work implement operation amount is zero or greater but less than a1 in FIG. 8, the discharge capacity of the work implement pump 23 increases in response to an increase in the work implement operation amount whereby the discharge flow rate of the work implement pump 23 increases. That is, the speed of the work implement 3 is controlled due to the discharge capacity of the work implement pump 23 being controlled.

When the work implement operation amount reaches a1, the discharge capacity of the work implement pump 23 becomes the maximum capacity. When the work implement operation amount reaches or exceeds a1, the control unit 27 determines the command throttle value Th_cm on the basis of the work implement required engine rotation speed Nedm. That is, when the work implement operation amount is equal to or greater than a1, the required throttle determination unit 89 causes the engine rotation speed to be increased in response to the increase in the operation amount of the work implement operating member 52*a*. As a result, the speed of the work implement 3 increases. The discharge flow rate is fixed at an upper limit Qmax when the work implement operation amount is equal to or greater than a2.

When the speed control of the work implement 3 is performed using the engine rotation speed as described above, the transmission requirement determination unit 84 causes the required tractive force to fall to a value lower than a value determined on the basis of the operation amount of the accelerator operating member 51*a*. Specifically as illustrated in FIG. 6, the transmission requirement determination unit 84 causes the required tractive force to be reduced by multiplying the vehicle speed ratio VR by a predetermined reduction rate. The predetermined reduction rate is a value less than one. The predetermined reduction rate is set so as to increase in response to an increase in the work implement operation amount. Alternatively, the predetermined reduction rate may be a fixed value.

Figure 9A:
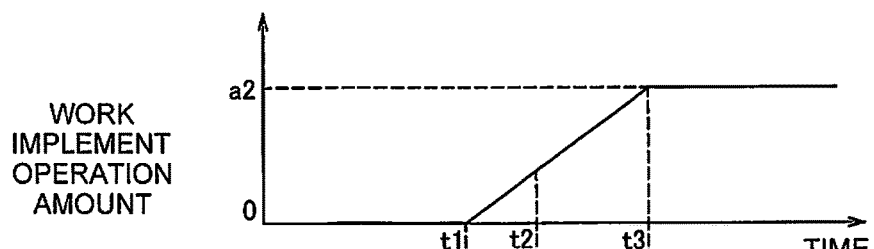
FIGS. 9A-9E are timing charts illustrating changes in parameters when controlling the speed of the work implement.
Figure 9B:
Figure 9C:
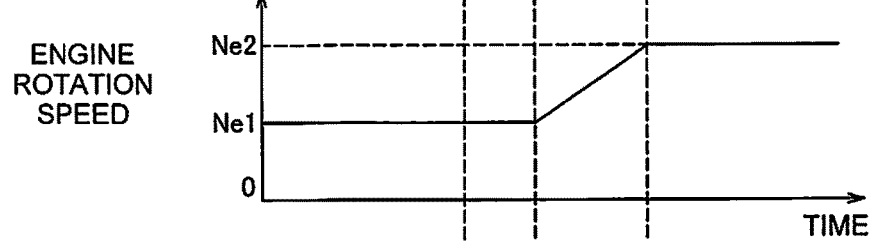
Figure 9D:
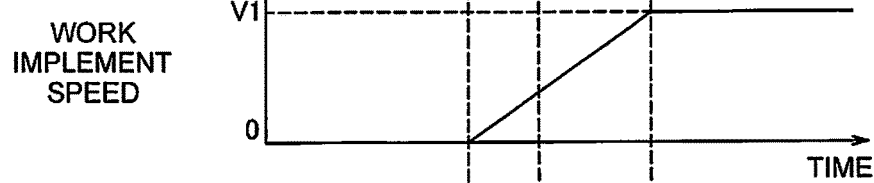
Figure 9E:
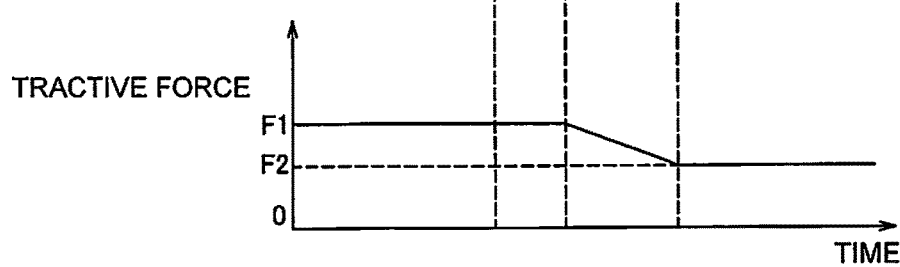

FIGS. 9A-9E are timing charts illustrating changes in parameters when controlling the speed of the work implement 3. As illustrated in FIG. 9B, the accelerator operation amount is fixed at Aac1. When the work implement operation amount is zero (point in time 0 to t1) as illustrated in FIG. 9A, the speed of the work implement 3 is zero as illustrated in FIG. 9D. The engine rotation speed is fixed at Ne1 as illustrated in FIG. 9C and the tractive force is fixed at F1 as illustrated in FIG. 9E.

When the work implement operation amount increases from zero, the speed of the work implement 3 is controlled by controlling the discharge capacity until the discharge capacity of the work implement 3 reaches the maximum capacity. As a result, while the engine rotation speed is fixed at Ne1, the speed of the work implement 3 increases (point in time t1 to t2). The tractive force is also fixed at F1 at this time.

When the work implement operation amount increases further and the discharge capacity of the work implement 3 reaches the maximum capacity, the speed of the work implement 3 is controlled by controlling the engine rotation speed (point in time t2 to t3). The engine rotation speed increases and the speed of the work implement 3 increases in correspondence to the increase in the work implement operation amount. Moreover, the tractive force is reduced in correspondence to the increase in the work implement operation amount.

When the work implement operation amount meets or exceeds a2, the engine rotation speed is fixed at Ne2. The speed of the work implement 3 is fixed at V1. The tractive force is fixed at F2.

The work vehicle 1 according to the present exemplary embodiment has the following features.

When the operator operates the work implement operating member 52*a*, the engine rotation speed is increased automatically due to the speed control of the work implement 3. As a result, the operator is able to adjust the speed of the work implement 3 by operating the work implement operating member 52*a* without operating the accelerator operating member 51*a*.

Moreover, the command torques for the motors MG1 and MG2 are determined so that the tractive force of the work vehicle 1 becomes the tractive force determined with the required tractive force characteristics. As a result, an increase in the tractive force is suppressed even if the engine rotation speed is increased due to the speed control of the work implement 3. Therefore, an increase in the vehicle speed can be suppressed without the operator operating the brake operating member 58*a*. As described above, the work vehicle 1 according to the present exemplary embodiment allows for the adjustment of the speed of the work implement 3 and the vehicle speed with an easy operation.

The required tractive force is determined on the basis of the accelerator operation amount. Moreover, the command torques for the motors MG1 and MG2 are determined so that the tractive force of the work vehicle 1 becomes the required tractive force. Therefore, the tractive force is outputted in accordance with the accelerator operation amount. As a result, the vehicle speed can be adjusted in response to the accelerator operation amount even if the engine rotation speed increases due to the speed control of the work implement 3.

The speed of the work implement 3 is controlled by controlling the discharge capacity of the work implement pump 23 until the discharge capacity becomes the maximum capacity. The speed of the work implement 3 is controlled with the engine rotation speed when the discharge capacity of the work implement pump 23 reaches the maximum capacity. Accordingly, fuel consumption can be improved.

The speed of the work implement 3 when the work implement operating member 52*a* is operated to the predetermined amount while the work vehicle 1 is traveling at a high engine rotation speed is the same as the speed of the work implement 3 when the work implement operating member 52*a* is operated to the same amount as the above predetermined amount while the work vehicle 1 is traveling at a low engine rotation speed. That is, the relationship between the work implement operation amount and the speed of the work implement 3 is the same regardless of whether the engine rotation speed is high or low.

The required tractive force is reduced to a value lower than a value determined on the basis of the accelerator operation amount when the speed control of the work implement 3 is performed using the engine rotation speed. In this case, a behavior similar to a conventional work vehicle can be realized. That is, the driving power distributed to the travel device 25 is reduced by increasing the driving power distributed to the work implement pump 23 when the operator operates the work implement operating member 52*a* to increase the speed of the work implement 3 in the conventional work vehicle. As a result, the behavior of a reduction in the tractive force is brought about in the vehicle when the operator operates the work implement operating member 52*a*. A sense of discomfort by the operator can be suppressed in the work vehicle 1 according to the present exemplary embodiment due to the realization of the behavior similar to the conventional work vehicle in this way.

The present invention is not limited to the above exemplary embodiments and various changes and modifications may be made without departing from the spirit of the invention.

The present invention is not limited to the above-mentioned wheel loader and may be applied to another type of work vehicle, such as a bulldozer, a tractor, a forklift, or a motor grader.

The present invention may be applicable to another type of speed change device, such as an HMT, without being limited to the EMT. In this case, the first motor MG1 functions as a hydraulic motor and a hydraulic pump. The second motor MG2 functions as a hydraulic motor and a hydraulic pump. The first motor MG1 and the second motor MG2 are variable capacitor pump/motors, and the capacities are controlled by the control unit 27 controlling the tilt angle of the skew plate or the inclined shaft. The capacities of the first motor MG1 and the second motor MG2 are controlled so that the command torques Tm1_ref and Tm2_ref calculated in the same way as in the above exemplary embodiments are outputted.

The configuration of the power transmission device 24 is not limited to the configuration of the above exemplary embodiments. For example, the coupling and disposition of the elements of the two planetary gear mechanisms 68 and 69 are not limited to the coupling and disposition of the above exemplary embodiments. However, the number of the planetary gear mechanisms provided in the power transmission device 24 is not limited to two. The power transmission device 24 may only have one planetary gear mechanism. Alternatively, the power transmission device 24 may have three or more planetary gear mechanisms.

The control of the power transmission device 24 is not limited to the control of the above exemplary embodiment. That is in the present exemplary embodiment, the target input shaft torque Te_ref and the target output shaft torque To_ref are determined so that predetermined vehicle speed—tractive force characteristics can be achieved in which the tractive force changes continuously in response to the vehicle speed. However, the target input shaft torque Te_ref and the target output shaft torque To_ref may be set optionally.

The torque-balance information is not limited to the equations for balancing the torque as in the above exemplary embodiment. For example, the torque-balance information may be in the format of a table or a map.

The work implement pump is not limited to one and two or more work implement pumps may be provided. In this case, the above-mentioned discharge capacity is the sum of the discharge capacities of the plurality of work implement pumps.

The reduction of the tractive force may not be performed when the speed control of the work implement 3 is performed by controlling the engine rotation speed. Alternatively, the reduction of the tractive force is not limited to the method of multiplying the vehicle speed ratio VR by a predetermined reduction rate, and another method may be used.

Figure 10A:
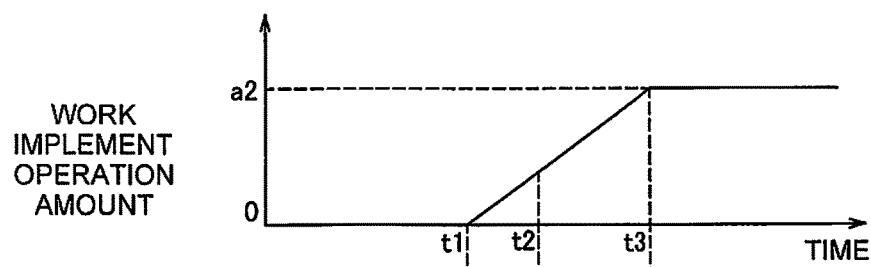
FIGS. 10A-10E are timing charts illustrating changes in parameters when controlling the speed of the work implement according to another exemplary embodiment.
Figure 10B:
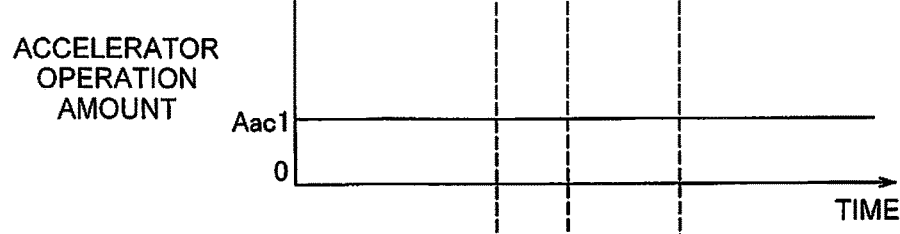
Figure 10C:
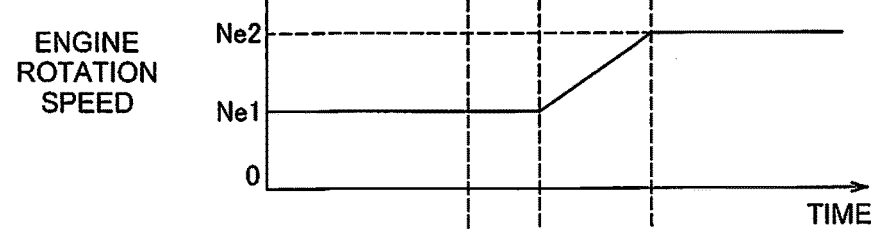
Figure 10D:
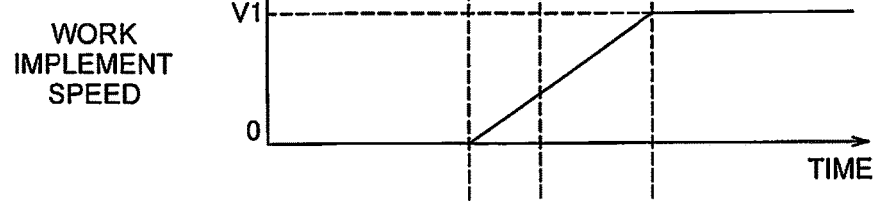
Figure 10E:
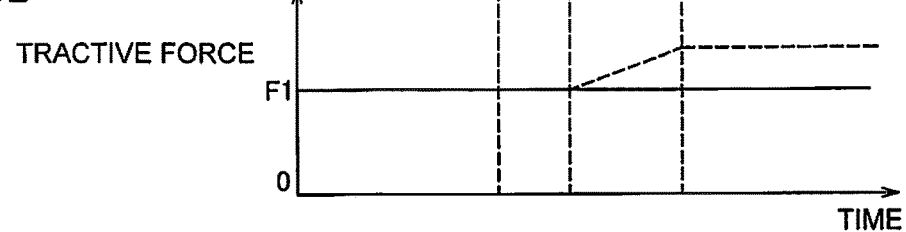

The tractive force can be increased slightly as depicted by the dashed line in FIG. 10E due to inertia of the planetary gear mechanism connected to the engine when the engine rotation speed is increased on the basis of a lever operation in the work vehicle provided with the planetary gear mechanism as in the above exemplary embodiment. Therefore, the tractive force is greater in comparison to when a speed control is not performed when the engine rotation speed is increased due to speed control of the work implement 3 being performed by controlling the engine rotation speed as described above. This increase in the tractive force is tied to an increase in the traveling acceleration of the work vehicle and leads to an increase in the vehicle speed of the work vehicle. A sense of discomfort may be felt by the operator due to the increase in the vehicle speed brought about by an operation of the work implement lever in this way.

Accordingly, when the speed control of the work implement 3 is performed by controlling the engine rotation speed, the reduction rate may be determined so that the tractive force is maintained regardless of the operation of the work implement operating member 52a. In this case, the required tractive force is reduced so that the tractive force is maintained regardless of the operation amount of the work implement operating member 52a even if the engine rotation speed increases due to the above control. As a result, the tractive force is maintained at the level before the operation of the work implement operating member 52a as depicted by the solid line in FIG. 10E. FIGS. 10A-10D are similar to FIGS. 9A-9D, respectively. As a result, any sense of discomfort felt by the operator can be suppressed.

The speed control of the work implement 3 may be performed by controlling the engine rotation speed before the capacity of the work implement pump 23 reaches the maximum capacity.

Figure 11:
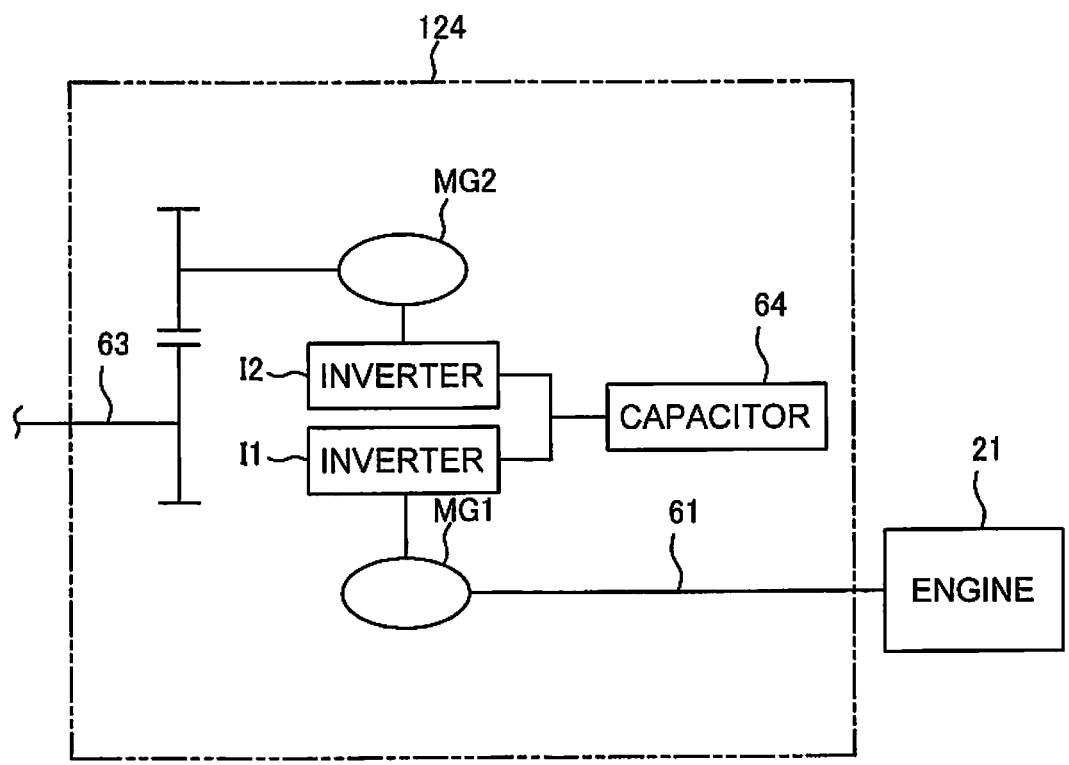
FIG. 11 is a schematic view illustrating a power transmission device according to a first modified example.

The power transmission device is not limited to a so-called split system device using the planetary gear mechanism as described above, and may use a device of another system. For example, FIG. 11 is a schematic view illustrating a power transmission device 124 according to a first modified example. The power transmission device 124 illustrated in FIG. 11 is a so-called series system power transmission device. The engine 21 in the power transmission device 124 only uses the first motor MG1 to generate electricity. The second motor MG2 uses the electrical power generated in the first motor MG1 to drive the travel device. The second motor MG2 also generates electricity by recovering energy during deceleration.

Figure 12:
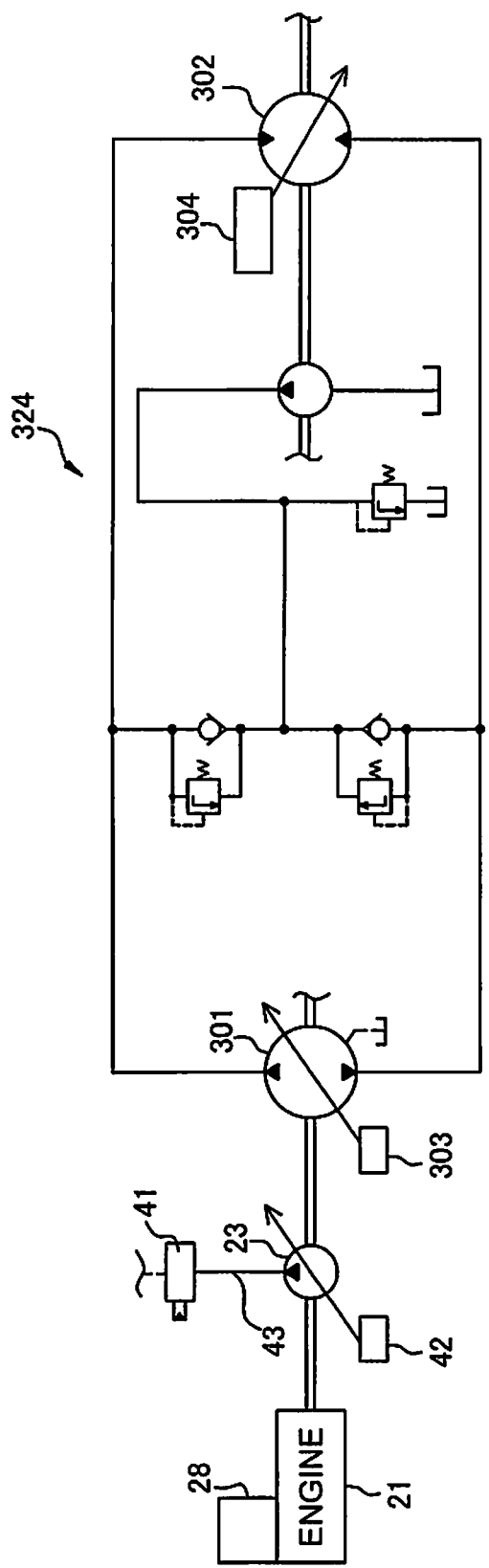
FIG. 12 is a schematic view illustrating a power transmission device according to a second modified example.

Alternatively, the power transmission device is not limited to a so-called hybrid power transmission device that uses the motors as described above. For example, FIG. 12 is a schematic view illustrating a power transmission device 324 according to a second modified example. The power transmission device 324 is a so-called hydro-static transmission (HST) device. The power transmission device 324 has a travel pump 301 and a travel motor 302. The travel pump 301 is driven by the engine 21. The travel pump 301 is a variable capacity hydraulic pump and the capacity of the travel pump 301 is controlled by a pump capacity control device 303. The travel motor 302 drives the travel device by being driven by hydraulic fluid discharged from the travel pump 301. The travel motor 302 is a variable capacity hydraulic motor and the capacity of the travel motor 302 is controlled by a motor capacity control device 304. The vehicle speed and the tractive force are controlled by controlling the engine rotation speed, the capacity of the travel pump 301, and the capacity of the travel motor 302 and the like.

Configurations that are the same in the above exemplary embodiment are provided with the same reference numerals in FIGS. 11 and 12 and explanations thereof are omitted.

A work vehicle that is able to adjust the speed of the work implement with a simple operation, and a method for controlling the work vehicle are provided according to exemplary embodiments of the present invention.

What is claimed is:

1. A work vehicle comprising:
an engine including a throttle device;
a hydraulic pump driven by the engine;
a work implement operatively arranged to be driven by hydraulic fluid discharged from the hydraulic pump;
a travel device driven by the engine, the travel device including at least one axle and at least one wheel to move the work vehicle;
a power transmission device including an input shaft, a gear mechanism, an output shaft, and a motor, the input shaft being arranged to receive driving power from the engine and input the driving power to the gear mechanism, the gear mechanism having a plurality of gears including a motor gear, the output shaft being arranged to receive the driving power transmitted through the gear mechanism and transmit the driving power to the travel device, the motor having a motor shaft fixed to the motor gear, the power transmission device being configured such that a rotation speed ratio of the output shaft with respect to the input shaft is changed by changing a rotation speed of the motor;

an accelerator operating device including an accelerator operating member and an accelerator operation detector, the accelerator operating member being configured to be operated by an operator to change an engine rotation speed, and the accelerator operation detector being configured and arranged to detect an operation amount of the accelerator operating member;

a work implement operating device including a work implement operating member and a work implement operation detector, the work implement operating member being configured to be operated by the operator to operate the work implement, and the work implement operation detector being configured and arranged to detect an operation amount of the work implement operating member; and a control unit operatively arranged to receive detection signals from the accelerator operation detector and the work implement operation detector and to transmit a command to the throttle device to control the engine rotation speed, the control unit being programmed to increase a speed of the work implement by increasing the engine rotation speed such that a discharge flow rate of the hydraulic pump increases when the operation amount of the work implement operating member is increased, the control unit being configured to determine a target tractive force value based on the operation amount of the accelerator operating member and to control an output torque of the motor so that a tractive force of the vehicle becomes equal to the target tractive force value regardless of the operation amount of the work implement operating member.

2. A method for controlling a work vehicle equipped with an engine, a hydraulic pump driven by the engine, a work implement driven by hydraulic fluid discharged from the hydraulic pump, a travel device including at least one axle driven by the engine, an accelerator operating member for changing an engine rotation speed, and a work implement operating member for operating the work implement, and a power transmission device arranged and configured to transmit rotation of the engine to the at least one axle, the power transmission device including an input shaft, a gear mechanism, an output shaft, and a motor, the input shaft being arranged to receive driving power from the engine and transmit the driving power to the gear mechanism, the output shaft being arranged to receive the driving power transmitted through the gear mechanism and transmit the driving power to the travel device, the motor being connected to the gear mechanism, the power transmission device being configured such that a rotation speed ratio of the output shaft with respect to the input shaft is changed by changing a rotation speed of the motor, the method comprising:

a step for determining a target tractive force of the travel device for moving the work vehicle;

a step for causing a speed of the work implement to increase by causing the engine rotation speed to increase when an operation amount of the work implement operating member is increased; and a step for controlling an output torque of the motor such that a tractive force of the travel device becomes equal to the target tractive force value regardless of the operation amount of the work implement operating member.

3. The work vehicle according to claim 1, wherein the output shaft is coupled to the at least one axle of the travel device.

4. The work vehicle according to claim 1, wherein the control unit causes a discharge capacity of the hydraulic pump to increase in response to an increase of the operation amount of the work implement operating member when the operation amount of the work implement operating member is equal to or less than a predetermined operation amount, the discharge capacity of the hydraulic pump becomes a maximum capacity when the operation amount of the work implement operating member is the predetermined operation amount, and the control unit executes the increasing of the engine rotation speed in response to an increase in the operation amount of the work implement operating member when the operation amount of the work implement operating member is greater than the predetermined operation amount.

5. The work vehicle according to claim 1, wherein the control unit has a storage unit configured to store required flow rate information which defines a relationship between the operation amount of the work implement operating member and a required flow rate to the hydraulic pump, the control unit determines the required flow rate corresponding to the operation amount of the work implement operating member by referring to the required flow rate information, and the control unit determines the engine rotation speed on the basis of the required flow rate and the discharge capacity of the hydraulic pump.

6. The work vehicle according to claim 5, further comprising a work implement control valve configured to control a hydraulic pressure supplied to the work implement; and a capacity control device having a load sensing valve and configured to control the discharge capacity of the hydraulic pump so that a differential pressure between a discharge pressure of the hydraulic pump and an outlet hydraulic pressure of the work implement control valve becomes a predetermined value.

7. The work vehicle according to claim 1, wherein the control unit is programmed to reduce the target tractive force value to be lower than a value determined based on the operation amount of the accelerator operating member when the engine rotation speed is increased in response to an increase in the operation amount of the work implement operating member.

8. The work vehicle according to claim 7, wherein the control unit reduces the target tractive force so that the tractive force of the vehicle is reduced in comparison to before the operation of the work implement operating member.

9. The work vehicle according to claim 7, wherein the power transmission device has a planetary gear mechanism, and the control unit reduces the target tractive force so that the tractive force of the vehicle is maintained regardless of the operation amount of the work implement operating member.

10. The work vehicle according to claim 7, wherein
the control unit reduces the target tractive force by multiplying the target tractive force by a predetermined reduction rate.

* * * * *